United States Patent
Kumar et al.

(10) Patent No.: US 10,135,992 B2
(45) Date of Patent: Nov. 20, 2018

(54) AUTOMATING NOTIFICATIONS FOR MODIFICATION OF EVENTS BASED ON GEOGRAPHIC POSITIONING

(71) Applicant: CA, Inc., New York, NY (US)

(72) Inventors: Sharath Lakshman Kumar, Bangalore (IN); Stephen Prasad, Bangalore (IN); Arun Shetty, Bengaluru (IN); Vinay Narasimhamurthy, Bengaluru (IN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/380,655

(22) Filed: Dec. 15, 2016

(65) Prior Publication Data

US 2018/0176383 A1    Jun. 21, 2018

(51) Int. Cl.
| | | |
|---|---|---|
| G06Q 10/10 | (2012.01) | |
| H04L 29/06 | (2006.01) | |
| H04M 3/56 | (2006.01) | |
| H04W 4/029 | (2018.01) | |

(52) U.S. Cl.
CPC ........ H04M 3/565 (2013.01); G06Q 10/1095 (2013.01); H04L 65/1093 (2013.01); H04L 65/403 (2013.01); H04W 4/029 (2018.02)

(58) Field of Classification Search
CPC ............... H04M 3/565; G06Q 10/1095; H04L 65/1093; H04L 65/403; H04W 4/028
See application file for complete search history.

(56) References Cited

U.S. PATENT DOCUMENTS

| | | | | |
|---|---|---|---|---|
| 2006/0143064 A1* | 6/2006 | Mock | ..................... | G06Q 10/06 705/7.18 |
| 2009/0081994 A1* | 3/2009 | Drobot | .............. | H04M 1/72563 455/412.2 |
| 2013/0096813 A1* | 4/2013 | Geffner | ................. | H04W 4/003 701/117 |
| 2014/0372162 A1* | 12/2014 | Dhara | ................ | G06Q 10/1095 705/7.19 |
| 2016/0027442 A1* | 1/2016 | Burton | .................... | G10L 15/26 704/235 |

* cited by examiner

*Primary Examiner* — Qun Shen
(74) *Attorney, Agent, or Firm* — Sage Patent Group

(57) ABSTRACT

Provided are systems and methods for operating a mobile device of a first user that may include accessing a data repository to retrieve a first location of a future event scheduled at an event time to be attended by the first user and a second user, obtaining, from a position determination circuit of the mobile device, a second location of the mobile device, initiating transmission of a query to a route server to responsively obtain a time of arrival message including an arrival time for the first user to arrive at the first location from the second location, and, responsive to a difference in the arrival time and the event time exceeding a threshold duration, initiating transmission of a notification message that triggers a change in attendees that are physically present at the first location of the event without altering the event time of the event.

20 Claims, 14 Drawing Sheets

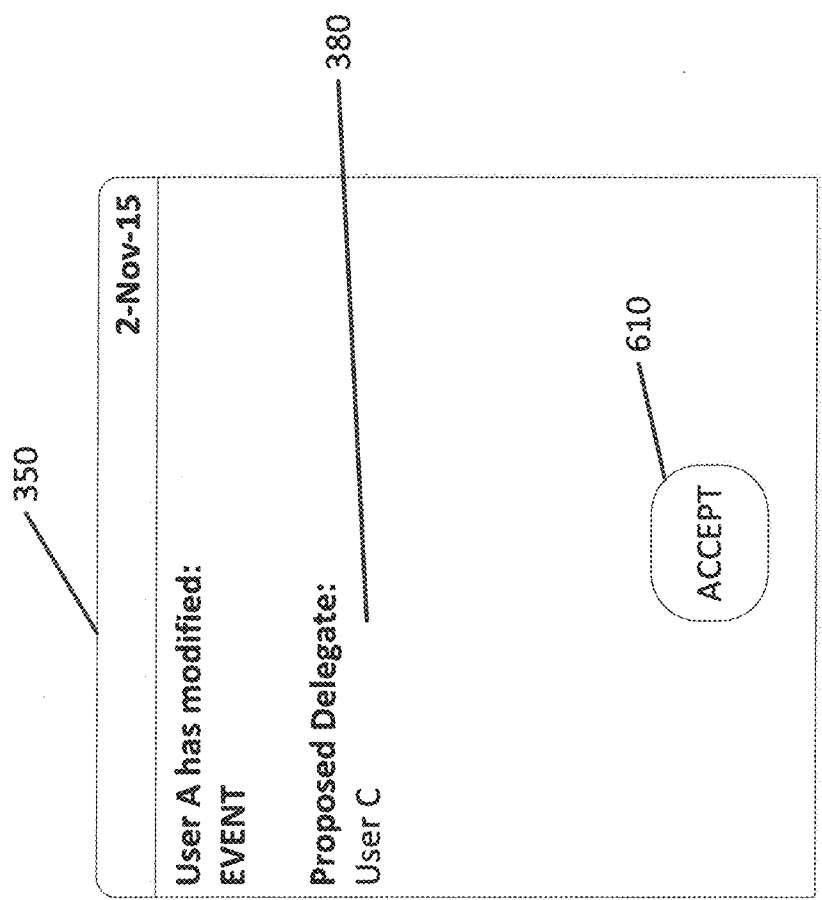

AUTOMATING NOTIFICATIONS FOR MODIFICATION OF EVENTS BASED ON GEOGRAPHIC POSITIONING

BACKGROUND

The present inventive concepts relate to electronic event management, and, in particular, modification of previously scheduled events.

Recent advances in technology have created a rich set of event management applications which allow users of such applications extensive control over appointments, meetings, and/or other events which the user has scheduled. Some applications allow for the user to access schedules of events dynamically via a personal mobile device, such as a mobile phone, carried by the user. The applications may alert the user, using mechanisms of the mobile device, when meetings are pending.

The mobile device of the user may maintain, or have access to, a schedule of the user, which the user can access as necessary to determine upcoming events for which the user is scheduled. Due to distributed locations of events and the complex schedules of event participants, the event participants can be late for, or miss entirely, the event due to delays associated with travel. For example, a user may be delayed for an event due to unexpected traffic delays, weather, etc.

Though scheduling applications exist which allow for updating, or even canceling, the event if an event participant is late or cannot attend, such scheduling applications require that the user be aware that they are going to be late and take affirmative steps within the scheduling application to modify the event.

BRIEF SUMMARY

According to aspects of the present inventive concepts, a method for operating a mobile device of a first user may include accessing a data repository to retrieve a first location of an event scheduled at an event time in the future that is to be attended by the first user and a second user, obtaining, from a position determination circuit of the mobile device of the first user, a second location of the mobile device, initiating transmission of a query through a network interface of the mobile device to a route server to responsively obtain a time of arrival message including an arrival time for the first user to arrive at the first location from the second location, and, responsive to a difference in the arrival time and the event time exceeding a threshold duration, initiating transmission of a notification message through the network interface of the mobile device that triggers a change in attendees that are physically present at the first location of the event without altering the event time of the event.

In some embodiments, responsive to a determination that the mobile device supports conferencing electronically, the notification message that triggers the change in the attendees that are physically present at the first location of the event may include information for conducting the event through an electronic conference.

In some embodiments, the notification message including the information for conducting the event through the electronic conference may be initiated for transmission further responsive to a determination that the mobile device has a power level above a threshold level.

In some embodiments, the notification message including the information for conducting the event through the electronic conference may be initiated for transmission further responsive to a determination that a call history of the mobile device contains a least one telephonic event performed between the first user and the second user.

In some embodiments, responsive to a determination that the mobile device is in motion and supports hands-free operation, the notification message that triggers the change in the attendees that are physically present at the first location of the event may include information for electronically establishing a phone conference for the event.

In some embodiments, responsive to a determination that the mobile device is not in motion, the notification message that triggers the change in the attendees that are physically present at the first location of the event may include information for electronically establishing a video conference for the event.

In some embodiments, the method may further include determining whether the first user is a mandatory attendee or an optional attendee of the event. Initiating transmission of the notification message through the network interface of the mobile device that triggers the change in the attendees that are physically present at the first location of the event may be performed responsive to a determination that the first user is a mandatory attendee of the event and may not be performed responsive to a determination that the first user is an optional attendee of the event.

In some embodiments, initiating the transmission of the notification message through the network interface of the mobile device that triggers the change in the attendees that are physically present at the first location of the event may be preceded by determining an alternate attendee to replace the first user at the event.

In some embodiments, determining the alternate attendee to replace the first user at the event may include accessing a data repository associated with a company of the first user to identify the alternate attendee as a third user sharing a corresponding organizational position within the company as the first user.

In some embodiments, determining the alternate attendee to replace the first user at the event may include identifying a first company of the first user, accessing an email history of the first user to identify messages related to a subject of the event, identifying at least one user corresponding to the identified messages related to the subject of the event, where the at least one user is employed at a same company as the first company of the first user, and designating the at least one user as the alternate attendee.

According to aspects of the present inventive concepts, a computer program produce may include a tangible non-transitory computer readable storage medium including computer readable program code embodied in the medium that when executed by at least one processor causes the at least one processor to perform operations including accessing a data repository to retrieve a first location of an event scheduled at an event time in the future that is to be attended by a first user and a second user, obtaining from a position determination circuit of a mobile device of the first user, a second location of the mobile device, initiating transmission of a query through a network interface of the mobile device to a route server to responsively obtain a time of arrival message including an arrival time for the first user to arrive at the first location from the second location, and, responsive to a difference in the arrival time and the event time exceeding a threshold duration, initiating transmission of a notification message through the network interface of the mobile device that triggers a change in attendees that are physically present at the first location of the event without altering the event time of the event.

In some embodiments, responsive to a determination that the mobile device is in motion and supports hands-free operation, the notification message that triggers the change in the attendees that are physically present at the first location of the event may include information for electronically establishing a phone conference for the event, and, responsive to a determination that the mobile device is not in motion, the notification message that triggers the change in the attendees that are physically present at the first location of the event may include information for electronically establishing a video conference for the event.

In some embodiments, the notification message may be initiated for transmission further responsive to a determination that the mobile device has a power level above a threshold level.

In some embodiments, the operations may further include determining whether the first user is a mandatory attendee or an optional attendee of the event. Initiating transmission of the notification message through the network interface of the mobile device that triggers the change in the attendees that are physically present at the first location of the event may be performed responsive to a determination that the first user is a mandatory attendee of the event and may not be performed responsive to a determination that the first user is an optional attendee of the event.

In some embodiments, the operations may further include providing the first user with an input to include additional content for inclusion with the notification message, recording audio content from the first user, converting the recorded audio content from the first user into text content, and initiating transmission of the text content through the network interface of the mobile device with the notification message that triggers the change in the attendees that are physically present at the first location of the event.

In some embodiments, initiating transmission of the notification message through the network interface of the mobile device that triggers the change in the attendees that are physically present at the first location of the event may be preceded by determining an alternate attendee to replace the first user at the event.

In some embodiments, determining the alternate attendee to replace the first user at the event may include accessing a data repository associated with a company of the first user to identify the alternate attendee as a third user sharing a corresponding organizational position within the company as the first user.

According to aspects of the present inventive concepts, a computer system may include a processor, a position determination circuit, a data repository, a network interface, and a memory coupled to the processor and including computer readable program code that when executed by the processor causes the processor to perform operations. The operations may include accessing the data repository to retrieve a first location of an event scheduled at an event time in the future that is to be attended by a first user and a second user, utilizing the position determination circuit to establish a second location of the computer system, transmitting a query through the network interface to a route server to responsively obtain a time of arrival message including an arrival time for the first user to arrive at the first location from the second location, and, responsive to a difference in the arrival time and the event time exceeding a threshold duration, transmitting a notification message through the network interface that triggers a change in attendees that are physically present at the first location of the event without altering the event time of the event.

In some embodiments, responsive to a determination that the computer system is in motion and supports hands-free operation, the notification message that triggers the change in the attendees that are physically present at the first location of the event may include information for electronically establishing a phone conference for the event, and, responsive to a determination that the computer system is not in motion, the notification message that triggers the change in the attendees that are physically present at the first location of the event may include information for electronically establishing a video conference for the event.

In some embodiments, transmitting the notification message through the network interface of the computer system that triggers the change in the attendees that are physically present at the first location of the event may be preceded by determining an alternate attendee to replace the first user at the event.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments of the present inventive concepts will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

Aspects of the present inventive concepts are illustrated by way of example and are not limited by the accompanying figures with like references indicating like elements.

FIG. 5 illustrates an example meeting reservation of an event messaging system according to embodiments of the present inventive concepts.

FIGS. 6A, 6B, 6C, 6D, 6E, and 6F illustrate example notification messages modifying an event according to embodiments of the present inventive concepts.

DETAILED DESCRIPTION

Figure 1:
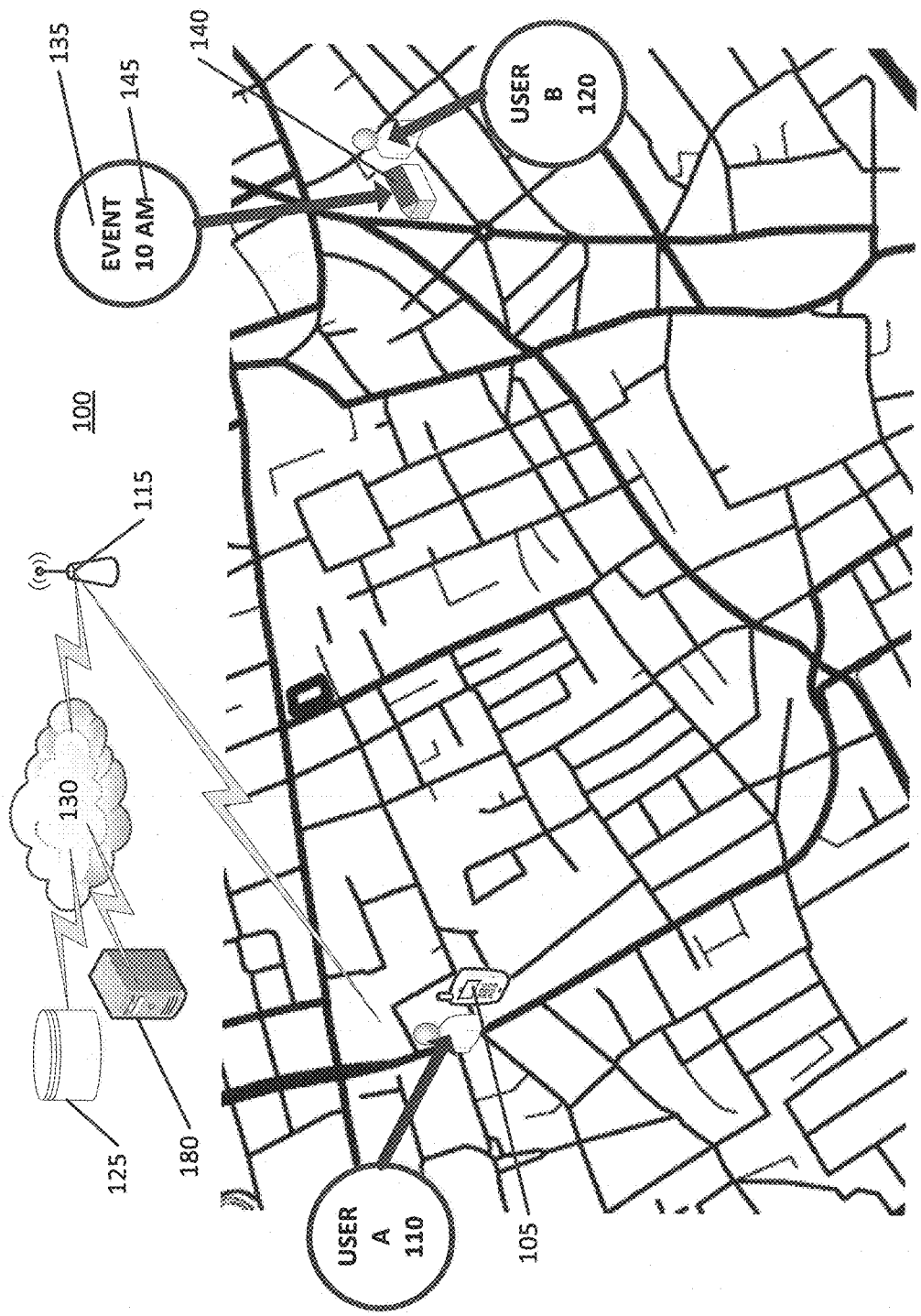
FIG. 1 illustrates an event messaging system including a mobile device of a user according to embodiments of the present inventive concepts.

The inventive concepts are described hereinafter with reference to the accompanying drawings, in which embodiments of the inventive concepts are shown. These inventive concepts may, however, be embodied in different forms and should not be construed as limited to the embodiments set forth herein. Rather, these embodiments are provided so that this disclosure is thorough and complete and fully conveys the scope of the inventive concepts to one skilled in the art.

The terminology used herein is for the purpose of describing particular aspects only and is not intended to be limiting of the present inventive concepts. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

It will be understood that although the terms "first," "second," etc. are used herein to describe members, regions, layers, portions, sections, components, and/or elements in example embodiments of the present inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the present inventive concepts. For example, a first element may also be referred to as a second element, and similarly, a second element may also be referred to as a first element, without departing from the scope of the present inventive concepts.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

As illustrated by embodiments of the present inventive concepts, an event participant may be made late for an event due to circumstances that occur during travel to the event. In such situations, the event participant may not be able to readily communicate that they are late. For example, the event participant may be driving, and the interface for rescheduling or canceling an event may be too complex to operate when driving. Though an event participant may be the user of a mobile device, circumstances may not allow, or make difficult, the use of the mobile device.

In some situations, the event participant may be unable to determine, or may be unaware, that their route to the event will result in a travel time that will make them late for the event. For example, the event participant may not realize that the most direct route to the event location will result in their arrival after the event has started.

As described herein, the present inventive concepts address methods, systems, and computer program products in which the mobile device of a user may automatically detect that the user will be late for an upcoming event, such as a meeting, and the mobile device may take subsequent steps to adjust or cancel the event. In some embodiments, adjusting the event may include altering the number of physical participants at the event by adding an electronic conference option to the event and/or replacing the user which is late with a delegated attendee.

Reference is now made to FIG. 1, which illustrates an event messaging system 100 including a mobile device 105 of a first user 110 according to embodiments of the present inventive concepts. The mobile device 105 may be communicatively coupled to a network 130. In some embodiments, the mobile device 105 may be communicatively coupled to the network 130 via a gateway 115. The gateway 115 may be, for example, a wireless network access point and/or a radio base station of a telecommunication network, though the present inventive concepts are not limited thereto.

The mobile device 105 may be further coupled to a data repository 125. As illustrated in FIG. 1, the data repository 125 may be directly accessible to the mobile device 105 and/or accessible via the network 130. For example, in some embodiments, the data repository 125 may be networked data storage, such as cloud storage. In some embodiments, the data repository 125 may be directly connected and/or coupled to the mobile device 105 such that the mobile device 105 may access data stored on the data repository 125 without accessing the network 130.

As illustrated in FIG. 1, the first user 110 (illustrated as USER A) may be scheduled to attend an event 135 with a second user 120 (illustrated as USER B). The event 135 may be at a first location 140 that is physically separated from the first user 110 such that the first user 110 must travel to the event 135. The event 135 may be scheduled to occur at a particular meeting time 145.

Figure 2:
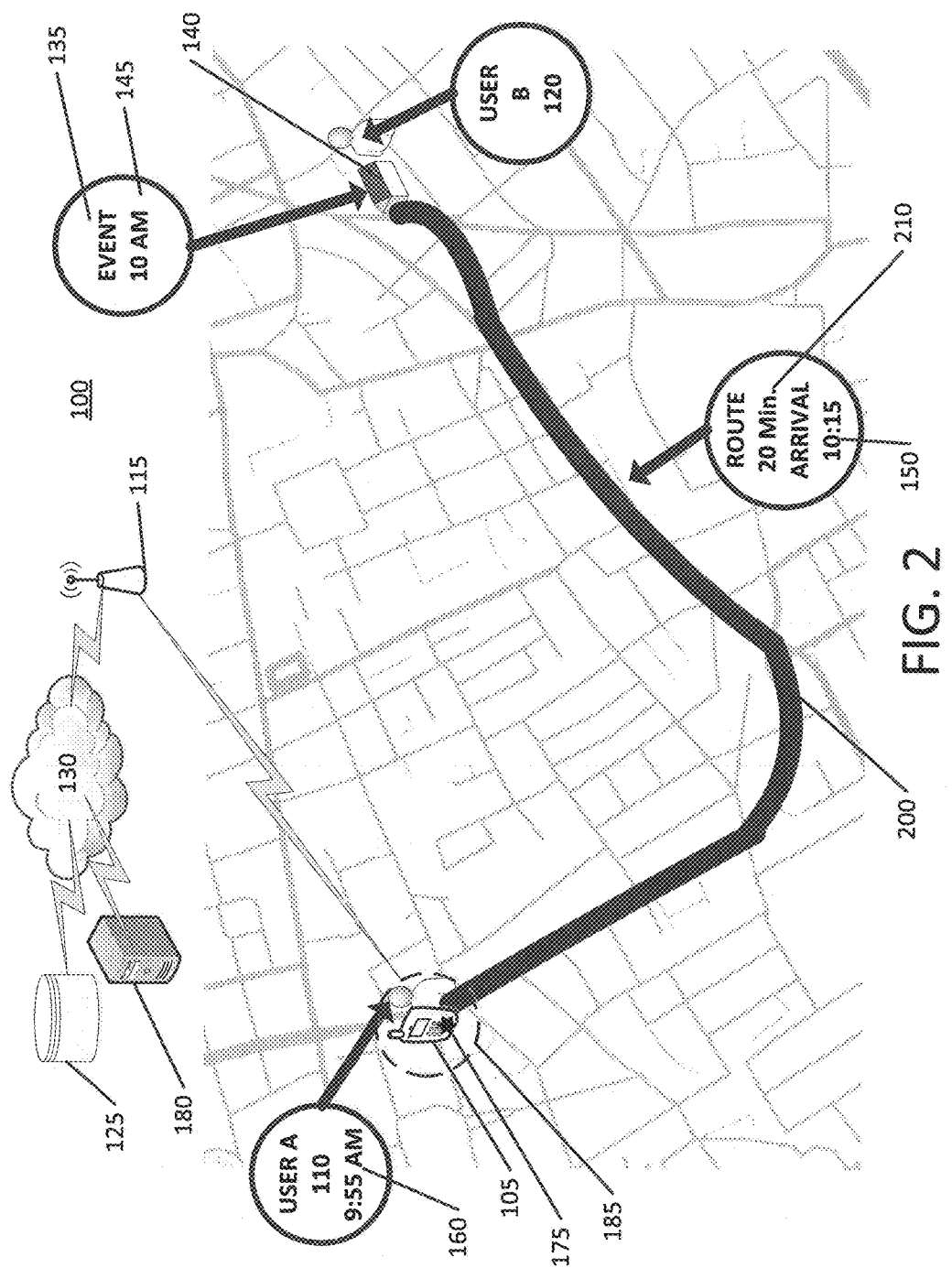
FIG. 2 illustrates the event messaging system of FIG. 1 in which the event messaging system has calculated an arrival time of the user of the mobile device at the event.

FIG. 2 illustrates the event messaging system 100 of FIG. 1 in which the event messaging system 100 has calculated an arrival time 150 of the first user 110 of the mobile device 105 at the event 135.

As illustrated in FIG. 2, the mobile device 105 may determine details of the event 135 to calculate the arrival time 150. For example, the mobile device 105 may determine that the event 135 begins at a particular event time 145 and takes place at a particular event location 140. In some embodiments, the mobile device 105 may determine the event time 145 from a calendar maintained on the mobile device 105. In some embodiments, the mobile device 105 may determine the event time 145 from the data repository 125.

Similarly, in some embodiments, the mobile device 105 may determine a first location 140 of the event 135 from a calendar maintained on the mobile device 105. In some embodiments, the mobile device 105 may determine the first location 140 from the data repository 125.

In some embodiments, the mobile device 105 may first determine an intermediate location for the event 135 and convert this intermediate location into the first location 140. For example, the mobile device 105 may retrieve an intermediate address of the event 135. The mobile device 105 may convert this intermediate address into a geographical location, such as an address suitable for Global Positioning System (GPS) tracking, which is the first location 140 of the event 135. As illustrated in FIG. 2, the mobile device 105 may determine the first location 140 of the event 135 directly, or may query the data repository 125 or other external server 180 connected to the network 130.

The mobile device 105 may also contain a positioning circuit 175. The positioning circuit 175 may be configured to determine a second location 185 of the mobile device 105. For example, the positioning circuit 175 may determine the second location 185 of the mobile device 105 via GPS. In some embodiments, the positioning circuit 175 may determine the second location 185 of the mobile device 105 via queries directed to the network 130 and/or the gateway 115. For example, in some embodiments, the gateway 115 may comprise one or more cellular towers in a radio telecommunications network capable of providing the second location 185 of the mobile device 105.

The mobile device 105 may determine that a current time 160 of the mobile device 105 is within a defined interval prior to the event time 145. For example, the mobile device 105 may determine that the current time 160 is within 30 minutes of the event time 145. Responsive to the determination that the current time 160 is within the defined interval prior to the event time 145, the mobile device may determine a travel time 210 of the mobile device 105 (and, indirectly, the first user 110) to the first location 140 of the event 135.

The arrival time 150 may be based on a predicted travel time 210 of a predicted route 200 between the first location 140 of the event 135 and the second location 185 of the mobile device 105. In some embodiments, the mobile device 105 may receive the travel time 210 and/or arrival time 150 by providing the first location 140 and second location 185 to the external server 180 via the network 130. The external server 180 may provide the travel time 210 and/or arrival time 150 via a message over the network 130 in response to the mobile device 105. In some embodiments, the mobile device 105 may calculate the arrival time 150 directly without accessing an external server 180.

The arrival time 150 may take into account travel conditions between the first location 140 of the event 135 and the second location 185 of the mobile device 105. For example, the arrival time 150 may take as inputs the routes involved, relative speed limits on the routes, current traffic conditions, weather, etc., though the present inventive concepts are not limited thereto. The arrival time 150 may represent a predicted time at which the first user 110 will arrive at the event 135.

The mobile device 105 may compare the arrival time 150 with the event time 145 to determine if the mobile device 105, and, by implication, the first user 110, will arrive at the event 135 by the event time 145. In some embodiments, the mobile device 105 may determine if the arrival time 150 is later than a particular threshold duration from the event time 145. Responsive to the mobile device 105 determining that the arrival time 150 exceeds the event time 145 by an amount greater than the threshold duration, the mobile device 105 may determine that the first user 110 is going to be late to the event 135.

By way of example, the mobile device 105 may determine that the event 135 begins at an event time 145 of 10 AM. The mobile device 105 may provide the external server 180 with the first location 140 of the event 135 and the second location 185 of the mobile device 105. The external server 180 may calculate a route 200 between the first location 140 and the second location 185. The external server 180 may also provide a route time 210 of 20 minutes to the mobile device 105. The mobile device 105 may determine that the present time of the mobile device 105 is 9:55 AM. By combining the route time 210 of 20 minutes with the current time of 9:55 AM, the mobile device 105 may determine that the predicted arrival time 150 at the event 135 is 10:15 AM. By comparing the predicted arrival time 150 with the event time 145, the mobile device 105 may determine that the first user 110 is predicted to be late to the event 135 by 15 minutes. The mobile device 105 may further determine that this lateness of 15 minutes exceeds a 10 minute lateness threshold configured in the mobile device 105. Responsive to this determination that the arrival time 150 will exceed the event time 145 by an amount greater than the determined threshold, the mobile device 105 may take steps, as outlined herein, to adjust a schedule and/or other configuration of the event 135.

The embodiments described herein are intended to convey one possible method for calculating an arrival time based on travel between a first location 140 and a second location 185. However, the present inventive concepts are not limited to this embodiment. It will be understood by those of skill in the art that other methods of determining an arrival time 150 based on travel between a first location 140 and a second location 185 are possible without deviating from the present inventive concepts.

The method described herein describe a single instance of determining a travel time between a first location 140 and a second location 185, but the present inventive concepts are not limited thereto. It will be understood that the mobile device 105 may continually monitor the arrival time 150 while travelling to the first location 140. As such, modifications to the conditions of the route 200 between the first location 140 and the second location 185 may result in an arrival time 150 of the route 200 changing.

Figure 3A:
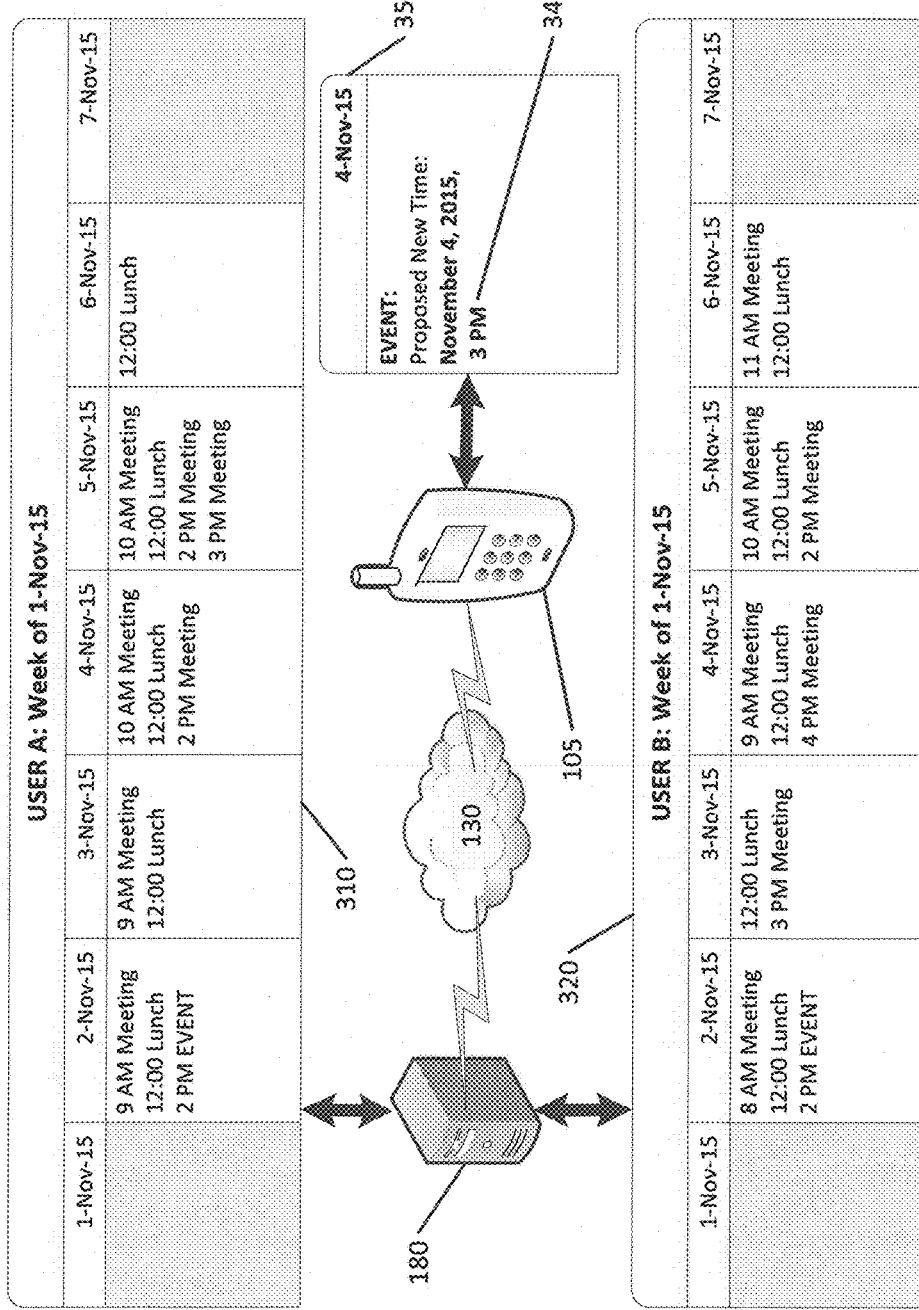
FIG. 3A illustrates an example of calculating an adjusted event time according to embodiments of the present inventive concepts.

FIG. 3A illustrates an example of calculating an adjusted event time 340 according to embodiments of the present inventive concepts. As described herein, the mobile device 105 may calculate the adjusted event time 340 responsive to a determination that an arrival time 150 of the first user 110 may exceed a currently-scheduled event time 140 by an amount greater than a threshold duration.

As illustrated in FIG. 3A, the mobile device 105 may access a first schedule 310 of the first user 110 and a second schedule 320 of a second user 120, an attendee of the event 135, via the network 130. The first schedule 310 of the first user 110 may include the times, locations, and durations of upcoming meetings and/or events to which the first user 110 is to attend. The second schedule 320 of the second user 120 may include the times, locations, and durations of upcoming meetings and/or events to which the second user 120 is to attend.

The mobile device 105 may determine a modified event time 340. The generation of the modified event time 340 may be based on analysis of the first schedule 310 and the second schedule 320. In some embodiments, the calculation of the modified event time 340 may comprise an analysis of the common times in which both the first user 110 and the second user 120 have free time in the first schedule 310 and the second schedule 320. The calculation may take into account the arrival time 150 determined previously. For example, if the arrival time 150 of the first user 110 at the event 135 is 10:30 AM, the calculation of the modified event time 340 may include analyzing only free times in the first schedule 310 and the second schedule 320 that occur after 10:30 AM of the present day.

In some embodiments, modifying the original event time 145 may include cancelling the meeting. In other words, determining a new modified event time 340 may comprise determining that the meeting should not take place. In some embodiments, the calculation of the modified event time 340 may include cancelling the event 135 if a common free time may not be found in which both the first user 110 and the second user 120 have free time in the first schedule 310 and the second schedule 320.

In some embodiments, the calculation of the modified event time 340 may take into account preferences of the first user 110 and/or the second user 120. For example, in some embodiments, the modified event time 340 may always be greater than 12 hours after the originally scheduled event time 145. In some embodiments, a preference of the first user 110 or the second user 120 may indicate that the event 135 should be cancelled if a common free time between the first schedule 310 and the second schedule 320 cannot be found within a 24 hour period after the originally-scheduled event time 145.

In some embodiments, the calculation of the modified event time 340 may be calculated by an external server 180 responsive to a request by the mobile device 105, and the modified event time 340 may be communicated to the mobile device 105.

In some embodiments, modifying the schedule of the event 135 may include converting the event 135 from an in-person event to an electronic event. For example, an in-person meeting may be converted to a teleconference or videoconference. In some embodiments, the modification to the schedule of the event 135 may include associating a call-in number and/or video conference link with the event 135 so that the first user 110 can attend the event 135 virtually using the mobile device 105 rather than physically. In some embodiments, event 135 may be modified by adding the call-in number and/or video conference link without altering the event location 140 and/or the event time 145. In some embodiments, adding the call-in number and/or video conference link may be preceded by a determination that certain criteria are met, as discussed further herein.

Though FIG. 3A illustrates only a first schedule 310 and a second schedule 320, the present inventive concepts are not limited thereto. It will be understood that the operations of the inventive concepts may be applied to more than two users. In some embodiments, the analysis may be performed for all of the attendees of the event 135.

Once a modified event time 340 has been determined, a notification message 350 may be transmitted to attendees of the event 135. The notification message 350 may include the modified event time 340.

In some embodiments, the notification message 350 may include a notification that the event time has been changed to the modified event time 340. In some embodiments, the notification message 350 may be a proposed modified event time 340. A proposal for a modified event time 340 may require agreement from one or more other attendees of the event 135 before resulting in a change to the event 135.

FIG. 3A illustrates an example of determining a modified event time 340 and sending a notification message 350. As illustrated in FIG. 3A, the mobile device 105 may determine that a modified event time 340 is needed upon determining that an arrival time 150 of the mobile device 105 may exceed a threshold duration from the schedule event time 145 of the event 135. Responsive to this determination, the first schedule 310 of the first user 110 and the second schedule 320 of the second user 120 may be accessed. By analyzing the first schedule 310 and the second schedule 320, it may be determined that a free time exists in the future. As illustrated in FIG. 3A, it may be determined that both the first user 110 and the second user 120 have a free time between 3 and 4 PM on Nov. 4, 2015. Thus, 3 PM on Nov. 4, 2015, may become the modified event time 340. Responsive to this determination, a notification message 350 may be generated including the proposed modified event time 340. This notification message 350 may be transmitted to the second user 120.

Though FIG. 3A illustrates the mobile device 105 accessing the network 130 to access the first schedule 310 of the first user 110 and the second schedule 320 of the second user 120, it will be understood that, in some embodiments, the mobile device 105 may access these schedules directly or, in some embodiments, may access these schedules through an external server such as the external server 180 illustrated in FIGS. 1 and 2. Similarly, though FIG. 3A illustrates the mobile device 105 transmitting the notification message 350 modifying the event 135, it will be understood that transmission of the notification message 350 may be performed by another entity, such as, for example, the external server 180 illustrated in FIGS. 1 and 2, on behalf of the mobile device 105.

Figure 3B:
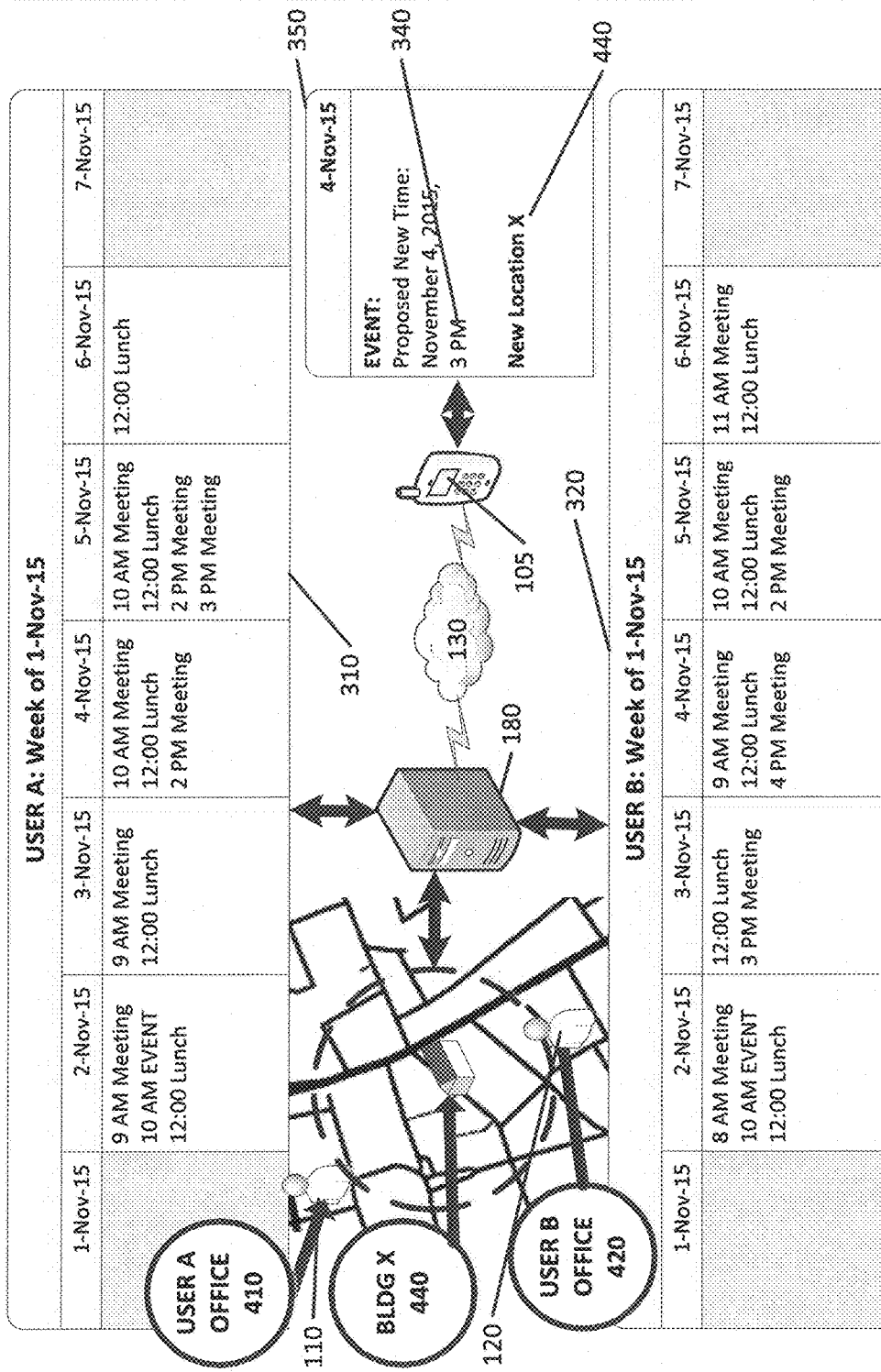
FIG. 3B illustrates an example of calculating an adjusted event location according to embodiments of the present inventive concepts.

In some embodiments, the notification message 350 may also include modifications to the location of the event 135. FIG. 3B illustrates an example of calculating an adjusted event time 340 and adjusted event location 440 according to embodiments of the present inventive concepts.

As illustrated in FIG. 3B, modifying a schedule of the event 135 may include modifying the location 140 of the event 135. That is to say that the operations may take into account that a modified location 440 may be more convenient for the modified event time 340. In some embodiments, the modified event location 440 may be determined based on which locations are available for scheduling during the modified event time 340 as described with reference to FIG. 3A.

For example, if a modified event time 340 of 3 PM on Nov. 4, 2015, is determined, a modified event location 440 may be determined based on which resources are available at that time. In some embodiments, criteria for the event 135 may be taken into account when determining this modified event location 440. For example, if the event 135 requires particular equipment, such as a telephone, overhead projector, etc., the modified event location 440 may be selected only from locations which have those resources and are available at the modified event time 340.

In some embodiments, determining the modified event location 440 may include taking into account relative locations of the attendees. For example, responsive to an indication that the event 135 is to be modified, a first office location 410 of the first user 110 and a second office location 420 of the second user 120 may be determined. Though FIG. 3B illustrates office location for the first user 110 and second user 120, it will be understood that other locations are possible, such as a home of the user or a location at which the user is present immediately prior to the modified event time 340.

Based on the first office location 410 and the second office location 420, the modified event location 440 may be determined based on locations which are equidistant between the first office location 410 and the second office location 420. In some embodiments, the modified event location 440 may be determined based on a proximity of a particular location to the second office location 420. For example, if the first user 110 would like to select a modified event location 440 for an event 135 with the second user 120, the modified event location 440 may be selected from locations which are within one mile of the second office location 420 of the first user.

Upon determining the modified event location 440, the mobile device 105 may include the modified event location 440 within the notification message 350. In some embodiments, modifying the event 135 from a first event location 140 to a modified event location 440 may result in a reservation of the first event location 140 being freed for other uses.

Figure 4:
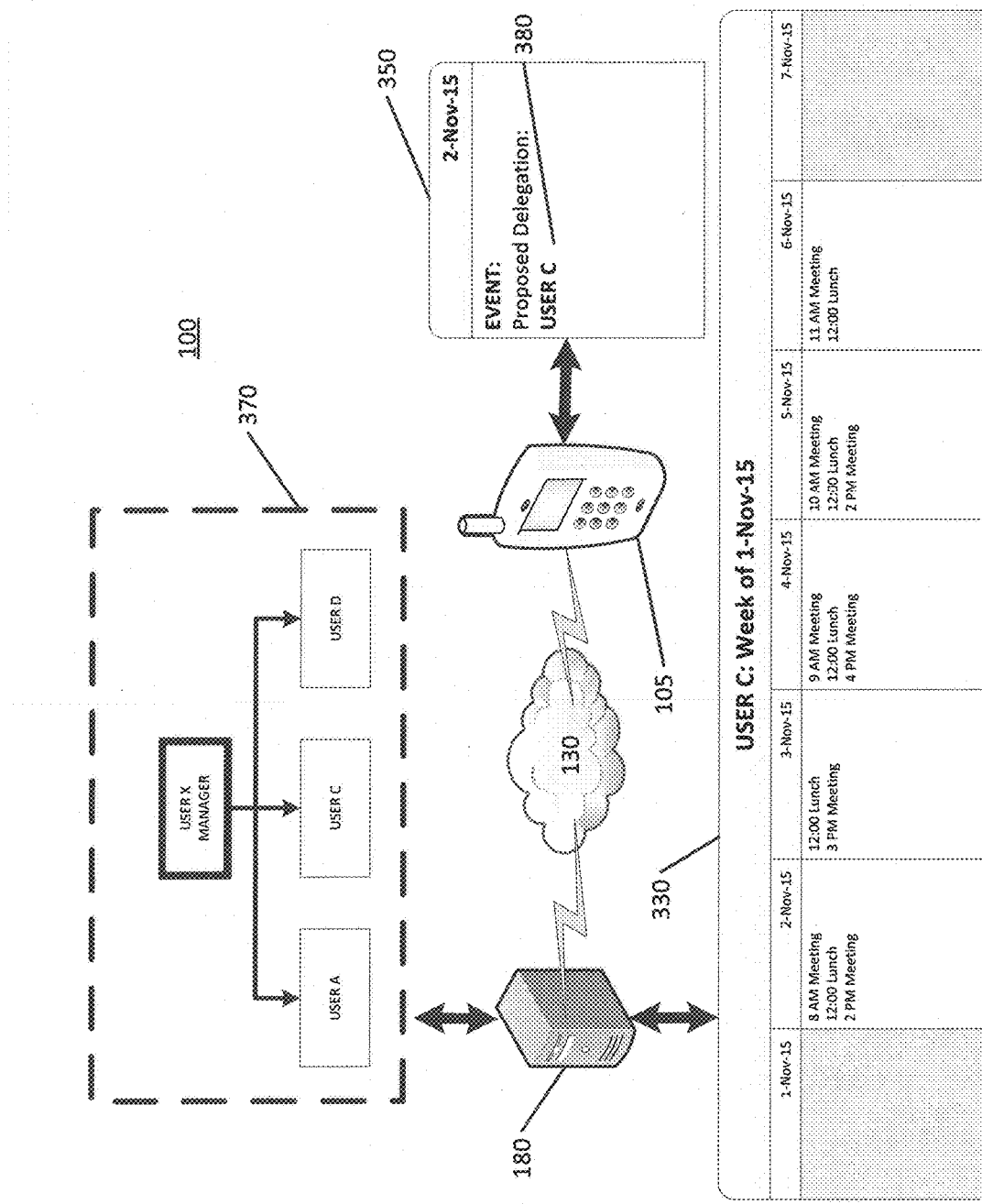
FIG. 4 illustrates an example of calculating an alternate attendee for an event according to embodiments of the present inventive concepts.

As described herein, in some embodiments, the event 135 may be altered by changing the attendees that are physically present at the event. In some embodiments, this alteration may be performed by adding call-in and/or video options to the event 135. In some embodiments, this alteration may be performed by replacing the first user 110 as an attendee at the event with an alternate attendee 380. The first user 110 may propose a delegation of the first user's attendance at the event to the alternate attendee 380. FIG. 4 illustrates an example of calculating an alternate attendee 380 for an event 135 according to embodiments of the present inventive concepts.

As illustrated in FIG. 4, modifying the attendees that are physically present at the event 135 may include designating an alternate attendee 380. Selecting the alternate attendee 380 may include determining one or more persons which are both familiar with the subject matter of the event 135 and available at the event time 145.

The event messaging system 100 may determine which persons are familiar with the subject matter of the event 135 in multiple ways. For example, in some embodiments, an organizational structure 370 of a company of the first user 110 may be accessed to determine persons who may be available as an alternate attendee 380. The organizational structure 370 may be accessed to determine, for example, other persons who may be in a same department as the first user 110. In some embodiments, the organizational structure 370 may reflect particular skills of the people within the organizational structure 370. In some embodiments, the organizational structure 370 may reflect tasks being performed by the first user 110, and may be queried to determine if there are other persons fulfilling similar tasks within the company.

The mobile device 105 may access the organizational structure 370 directly and/or may request that access be made by an external server 180 accessed by the mobile device 105 through the network 130. The mobile device 105 may access the organizational structure 370 itself to make the determination of persons which are familiar with the subject matter of the event 135, or the mobile device 105 may make a request of another resource, such as server 180, to make the determination on behalf of the mobile device 105.

As used herein, an organizational structure 370 may include, but is not limited to, lines of reporting within a company, particular skills of employees, particular tasks being performed by employees, prior experience and/or projects of employees, and the like.

In some embodiments, making the determination of persons which are familiar with the subject matter of the event 135 may include examination a communication history of the first user 110 to identify an alternate attendee 380 from those who have communicated with the first user 110 on topics related to the event 135. For example, the mobile device 105 may search through email of the first user 110 to find those persons with whom the first user 110 has communicated about the event 135. In some embodiments, the event messaging system 100 may look at addressees of email related to the event exchanged with the first user 110. The event messaging system 100 may further analyze the email addresses to determine those addressees which work are associated with the company of the first user 110. Though the use of email is described, the present inventive concepts are not limited thereto. In some embodiments, the event messaging system 100 may look at text messages, instant messages, and/or other types of social media posting.

The mobile device 105 may access the communications of the first user 110 directly and/or may request that access be made by an external server 180 accessed by the mobile device 105 through the network 130. The mobile device 105 may access the communications itself to make the determination of persons which are familiar with the subject matter of the event 135, or the mobile device 105 may make a request of another resource, such as server 180, to make the determination on behalf of the mobile device 105.

In some embodiments, the familiarity of a potential alternate attendee may be given a familiarity score. The familiarity score may represent a relative familiarity with the subject matter of the event 135. For example, a higher familiarity score may be given to those persons who are determined to be more familiar with the material and a lower familiarity score may be given to those determined to be less familiar. In some embodiments, the familiarity score may be based, in part, on the method used to determine the familiarity. For example, those persons identified as being familiar based on an analysis of the organizational structure 370 may be given a higher familiarity score than those identified by analyzing communications of the first user 110, or vice versa. Similarly, those persons identified by analyzing skills profiles within the organizational structure 370 may be given a higher familiarity score than those persons identified by analyzing a reporting structure within the organizational structure 370.

The potential delegates may be ranked based on their determined familiarity score. Once ranked, the event messaging system 100 may determine, based on the familiarity score, which potential delegates are free at the event time 145. This may be done by analyzing a third schedule 330 of the potential attendee to determine which times have not been scheduled for that person. In some embodiments, the event messaging system 100 will select as the alternate attendee 380 that person with the highest familiarity score that is free during the event time 145.

As an example, the event messaging system 100 may determine that an alternate attendee 380 is needed for an event 135 on Nov. 2, 2015, at 10 AM to attend the event 135 on behalf of the first user 110. As described herein, an organizational structure 370 of the company of the first user 110 and/or communications of the first user 110 may be analyzed to determine a list of potential attendees. The analysis may determine that a potential attendee (illustrated as USER C) shares a manager with the first user 110. A third schedule 330 of one of the potential attendee (USER C) may be analyzed to determine that the potential attendee is available during the time 145 of the event 135. Responsive to this determination, the event messaging system 100 may send a notification 350 proposing the person as an alternate attendee 380.

In will be understood that the steps described herein may be repeated to find the alternate attendee 380. In other words, if the first potential attendee that is most familiar with the subject matter of the event 135 is not available at the event time 145, the event messaging system 100 may continue with another potential attendee until an acceptable alternate attendee 380 is found.

Similarly, in some embodiments, the first potential attendee that is most familiar with the subject matter of the event 135 and available at the event time 145 may first be queried to determine if the potential attendee is willing to be a delegate to the event 135. Designation as the alternate attendee 380 may depend on the potential attendee accepting this responsibility. If the potential attendee refuses to be the alternate attendee, the event messaging system 100 may continue the process of determining another potential attendee.

As described herein, modifications to the event 135 may result in a notification message 350 being sent to other attendees of the event 135. In some embodiments, the notification message 350 may be preceded by presenting a user interface prompt to the first user 110 that requests the first user 110 to confirm the sending of the notification message 350. In some embodiments, to better support hands-free operation, the user interface prompt may present the first user 110 with an input option to cancel the sending of the notification message 350. If the first user 110 does not cancel the sending of the notification message 350, the notification message 350 may be sent automatically to the second user 120 and/or other attendees of the event 135.

Figures 5, 6A:
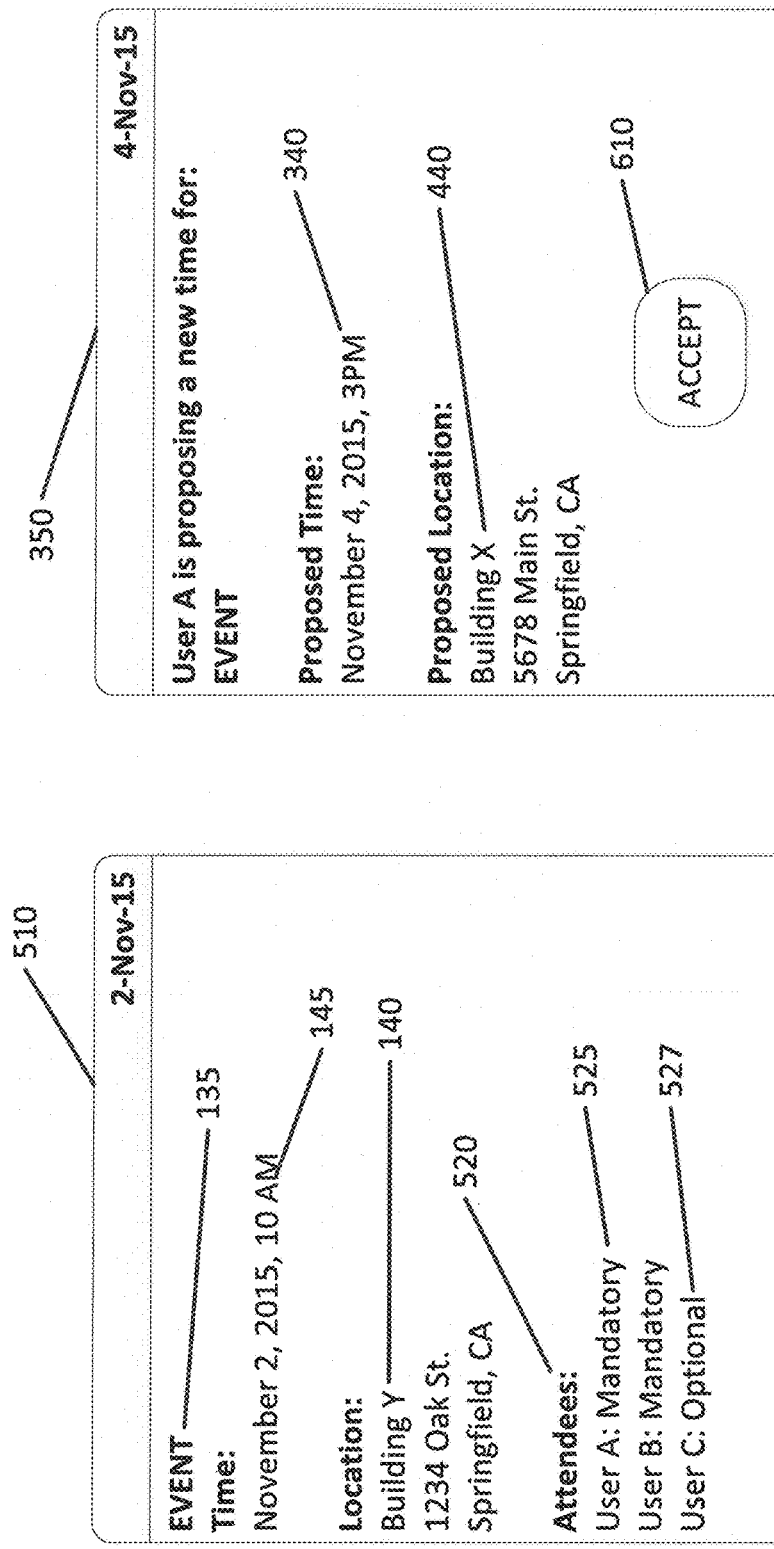

FIG. 5 illustrates an example meeting reservation 510 of an event messaging system 100 according to embodiments of the present inventive concepts.

The meeting reservation 510 may include information used by the event messaging system 100 to perform modifications of the scheduled event 135. This information may be used by the mobile device 105 and/or systems associated with the mobile device 105 to perform operations associated with the inventive concepts.

For example, the mobile device 105 may access the event time 145 and/or the event location 140 from the meeting reservation 510 to determine the arrival time 150 as discussed herein with respect to FIGS. 1 and 2.

In some embodiments, the meeting reservation 510 may include a list of attendees 520. The mobile device 105 may utilize the list of attendees 520 to determine those users whose calendars may be accessed to determine a modified event time 340.

In some embodiments, the list of attendees 520 may include attendees using calendar systems different from that of the first user 110. The mobile device 105 may utilize the network 130 to access the different calendar systems. For example, in some embodiments, the mobile device 105 may utilize the network 130 to access a first calendar system of one attendee and a second calendar system of another attendee. The mobile device 105 may normalize entries of the first calendar system and the second calendar system to determine the modified event time 340.

In some embodiments, the list of attendees 520 may include an "optional" 527 or a "mandatory" 525 designation. These designations can indicate the relative importance of the attendance of that particular person at the event 135. In some embodiments, the methods of the event messaging system 100 can be modified in response to these designations. For example, in some embodiments, the event time 145 of the event 135 may only be modified if the first user 110 is a mandatory 525 attendee, but not if the first user 110 is an optional 527 attendee. In other words, if the first user 110 is an optional 527 attendee, no action may be taken in some embodiments if an arrival time 150 of the first user 110 is after the event time 145 of the event 135. In some embodiments, if the first user 110 is an optional 527 attendee, the event 135 may be modified to remove the first user 110 as an attendee 520 if an arrival time 150 of the first user 110 is after the event time 145 of the event 135.

FIGS. 6A, 6B, 6C, 6D, 6E, and 6F illustrate example notification messages 350 modifying an event 135 according to embodiments of the present inventive concepts.

FIG. 6A illustrates an example notification message 350 including a modified event time 340 and a modified event location 440. The notification message 350 may include the modified event time 340 and/or the modified event location 440 as a proposal to other attendees to modify the event 135. The notification message 350 may include a user input 610 allowing the recipient of the notification message 350 to accept the proposal. Acceptance of the proposal included in the notification message 350 may modify the event 135 to replace the original event time 145 and event location 140 with the modified event time 340 and/or a modified event location 440.

Figure 6C:
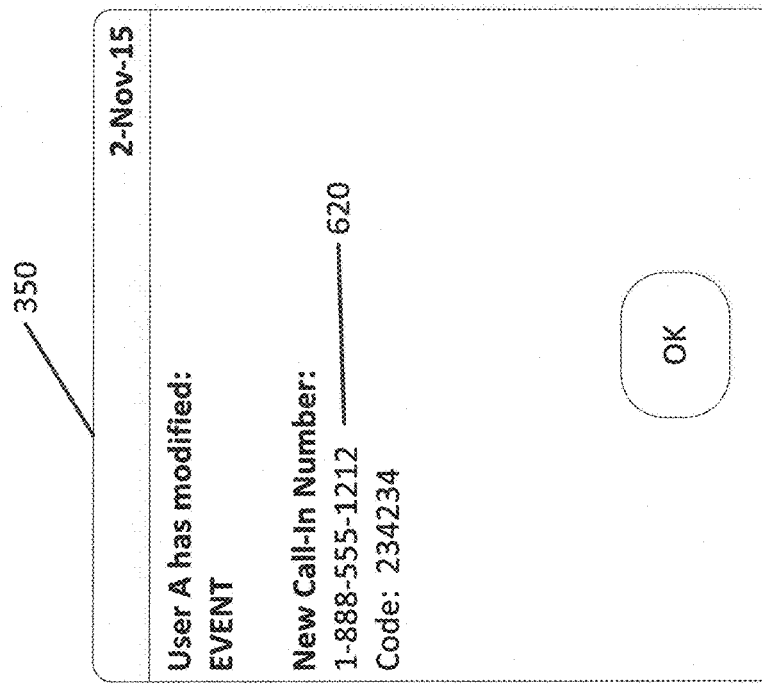
Figure 6B:
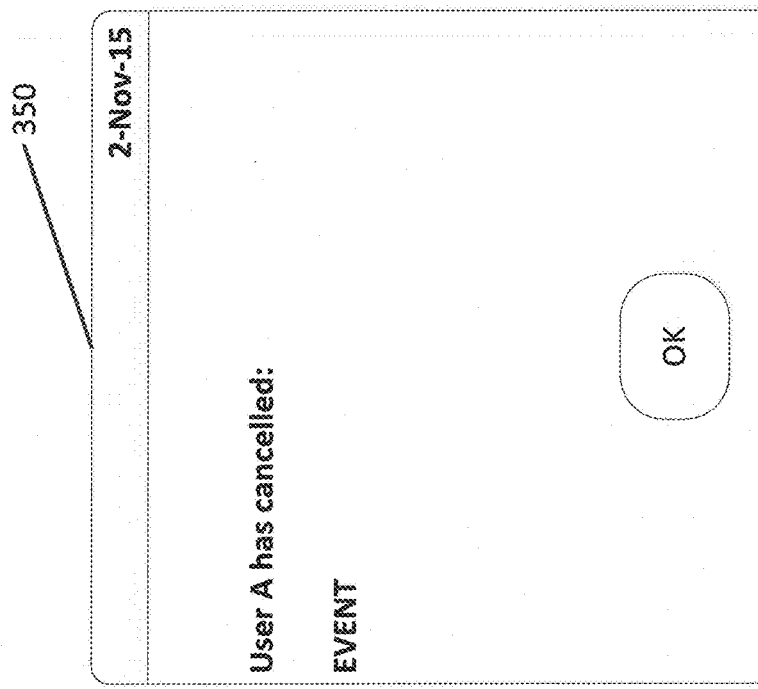

FIG. 6B illustrates an example notification message 350 including a cancellation of the event 135. As discussed herein, the modification of the event 135 may, in some embodiments, include cancellation of the event if a common free time may not be found in which both the first user 110 and the second user 120 have free time in the first schedule 310 and the second schedule 320, as described with respect to FIGS. 3A and 3B. A notification message 350 may not require additional input from the recipient of the notification message 350.

FIG. 6C illustrates an example notification message 350 including a modification of the event 135 which includes a call-in number 620. In some embodiments, the call-in number 620 may be added to the notification message 350 to allow the first user 110 to attend the event 135 in a teleconference via the mobile device 105. The call-in number may allow for the event 135 to be conducted as audio only, without requiring the physical presence of the first user 110. In some embodiments, the notification message 350 illustrated in FIG. 6C may be utilized if the mobile device 105 supports hands-free operation. For example, the mobile device 105 may support hands-free operation if the mobile device 105 is coupled to a device, such as a remote microphone and/or headset, which may be used while the first user 110 is operating a vehicle. In some embodiments, event 135 may be modified by adding the call-in number 620 without altering the event location 140 and/or the event time 145. The modification of the event 135 may also include other information, such as an access code, password, or the like, which may be used to access the teleconference.

Figure 6E:
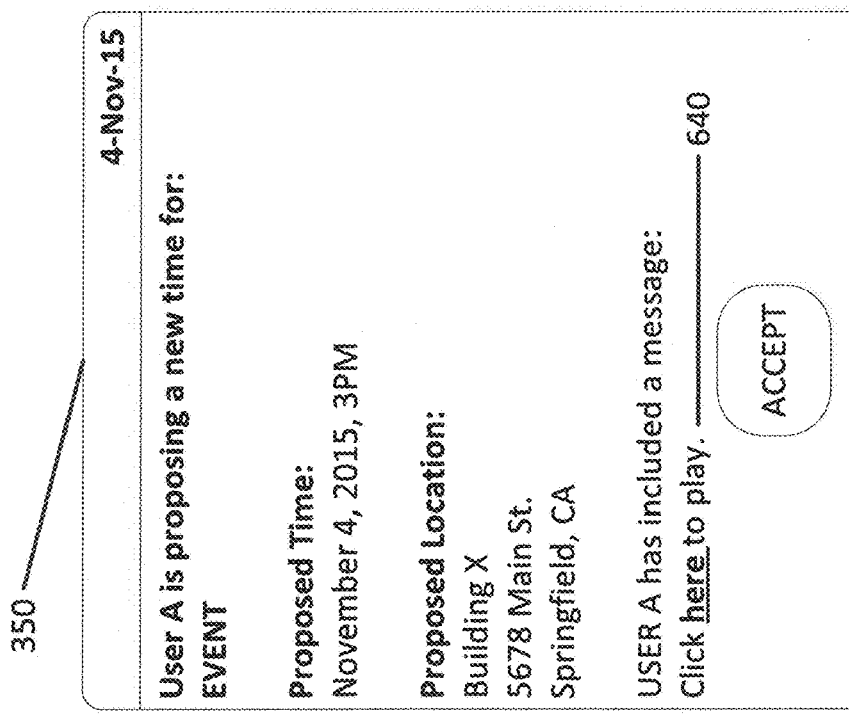
Figure 6D:
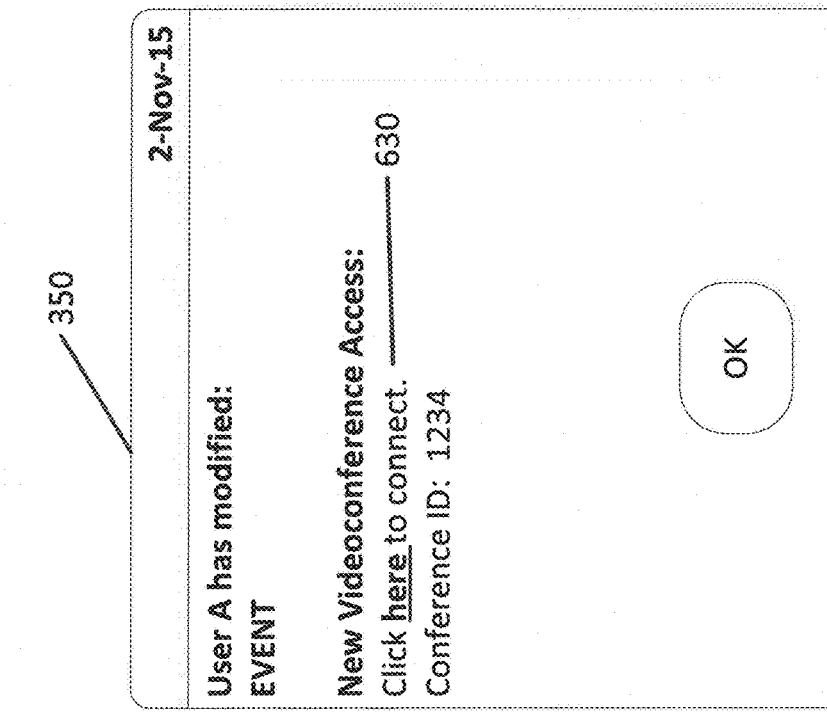

FIG. 6D illustrates an example notification message 350 including a modification of the event 135 which includes a link 630 to access a videoconference. In some embodiments, the link 630 may be added to the notification message 350 to allow the first user 110 to attend the event 135 virtually via the mobile device 105. The notification message 350 illustrated in FIG. 6D may be utilized if the mobile device 105 is coupled to a camera which may be used for videoconferencing. In some embodiments, the option to add a videoconferencing link may be selected in response to a determination that the first user 110 is able to conduct a videoconference. For example, the event messaging system may alter the meeting to include a videoconference link 630 responsive to a determination that the first user is moving slower than a certain speed. This may allow the first user 110 to utilize the videoconference link in situations when it would not be distracting to the first user 110, such as when the first user 110 was walking rather than driving. In some embodiments, event 135 may be modified by adding the link 630 without altering the event location 140 and/or the event time 145. The modification of the event 135 may also include other information, such as a conference ID, password, or the like, which may be used to access the videoconference.

As illustrated in FIGS. 6C and 6D, the notification message 350 may include options for attending the event 135 electronically. In some embodiments, additional processing may be performed by the mobile device 105 prior to altering the event 135 to include these electronic options. For example, upon determining that the arrival time 150 for the first user 110 will be later than the event time 145, the mobile device may access the positioning circuit 175 to determine if the mobile device 105 is in motion. As discussed herein, determining if the mobile device 105 is in motion may involve a direct determination by the mobile device 105, such as, for example, querying a GPS circuit associated with the positioning circuit 175. In some embodiments, determining if the mobile device 105 is in motion may involve communicating with other entities connected with the network 130, such as the gateway 115 or the external server 180.

In some embodiments, upon determining that the mobile device 105 is not in motion, the schedule of the event 135 may be altered to include a videoconference link 630, as illustrated in FIG. 6D. In other words, the event messaging system 100 may determine that the first user 110 can participate in a videoconference based on the determination that the mobile device 105 of the first user 110 has a camera and that the mobile device 105 of the first user 110 is not moving.

In some embodiments, upon determining that the mobile device 105 is in motion, the schedule of the event 135 may be altered to include a teleconference link 620, as illustrated in FIG. 6C. In some embodiments, the teleconference link 620 may be only if a hands-free microphone or other hands-free device is coupled to the mobile device 105. In other words, the event messaging system 100 may determine that the first user 110 can participate in a teleconference based on the determination that the mobile device 105 of the first user 110 is moving and that the mobile device 105 supports hands-free operation.

In some embodiments, the additional processing that may be performed by the mobile device 105 prior to altering the event 135 to include electronic conference options may include an analysis of a power level of the mobile device 105. For example, a determination may be made as to the battery level of the mobile device 105 and/or a connection to a power source. In some embodiments, the notification message 350 may include electronic options for the event 135 only responsive to a determination that the mobile device 105 has a power level greater than a defined threshold. That is to say that the event messaging system 100 may include electronic conference options for the alteration of the schedule of the event 135 responsive to a determination that the mobile device 105 has access to sufficient power to satisfy the requirements of attending the event 135 electronically.

In some embodiments, the additional processing that may be performed by the mobile device 105 prior to altering the event 135 to include electronic conference options may include an analysis a call history of the first user 110 of the mobile device 105. Responsive to a determination that the first user 110 has made at least one prior call to the second user 120, the event messaging system 100 may convert the event 135, either in whole or in part, to a teleconference and/or videoconference. In some embodiments, the event messaging system 100 may use the contact history of the mobile device 105 of the first user 110 to determine a phone number or other contact information for the second user 120. For example, the event messaging system 100 may analyze the prior contact history between the first user 110 and the second user 120 to determine contact information that was used in the past. In some embodiments, the event messaging system 100 may use a reserved conference number and/or video conference link for any teleconference and/or videoconference that is set up as a result of altering the event 135.

FIG. 6E illustrates an example notification message 350 including additional content provided by the first user 110. In some embodiments, upon determining that the event 135 will be altered, the mobile device 105 may prompt the first user 110 to provide content 640 to include with the notification message 350. For example, the first user 110 may include a recorded apology with the rescheduling of the event 135, or may provide additional details explaining why the first user 110 must miss the event 135 and requesting the modification of the event 135.

The content 640 from the first user 110 may take many forms as would be understood by one of skill in the art. For example, the content 640 may be an audio recording and/or a text message. In some embodiments, the first user 110 may speak a message into a microphone of the mobile device 105, and the mobile device 105 may convert the audio message from the first user 110 into text as part of the content 640.

FIG. 6F illustrates an example notification message 350 including an alternate attendee 380. The notification message 350 may include an indication identifying the alternate attendee 380, and may include a user input 610 allowing the recipient of the notification message 350 to accept the proposal. Acceptance of the proposal included in the notification message 350 may modify the event 135 to replace the first user 110 with the alternate attendee 380.

In some embodiments, the notification message 350 including an alternate attendee 380 may first be sent to the proposed alternate attendee. That is to say that the notification message 350 may first request permission of the proposed alternate attendee to accept the responsibility of being the alternate attendee 380. Responsive to acceptance by the potential alternate attendee, additional notification messages 350 may be sent to the other attendees of the event 135 informing them of the delegation.

As will be understood by one of skill in the art, the operation of the notification message 350 may be controlled by user preferences which can be accessed by the mobile device 105. For example, the user preferences may indicate a preference for audio conferencing versus video conferencing. In some embodiments, the user preferences may indicate whether a hands-free device must be coupled to the mobile device 105 before scheduling an audio conference. In some embodiments, the user preferences may indicate the required battery level of the mobile device 105, or that the mobile device is connected to external power, before an event 135 may be attended electronically.

Figure 7:
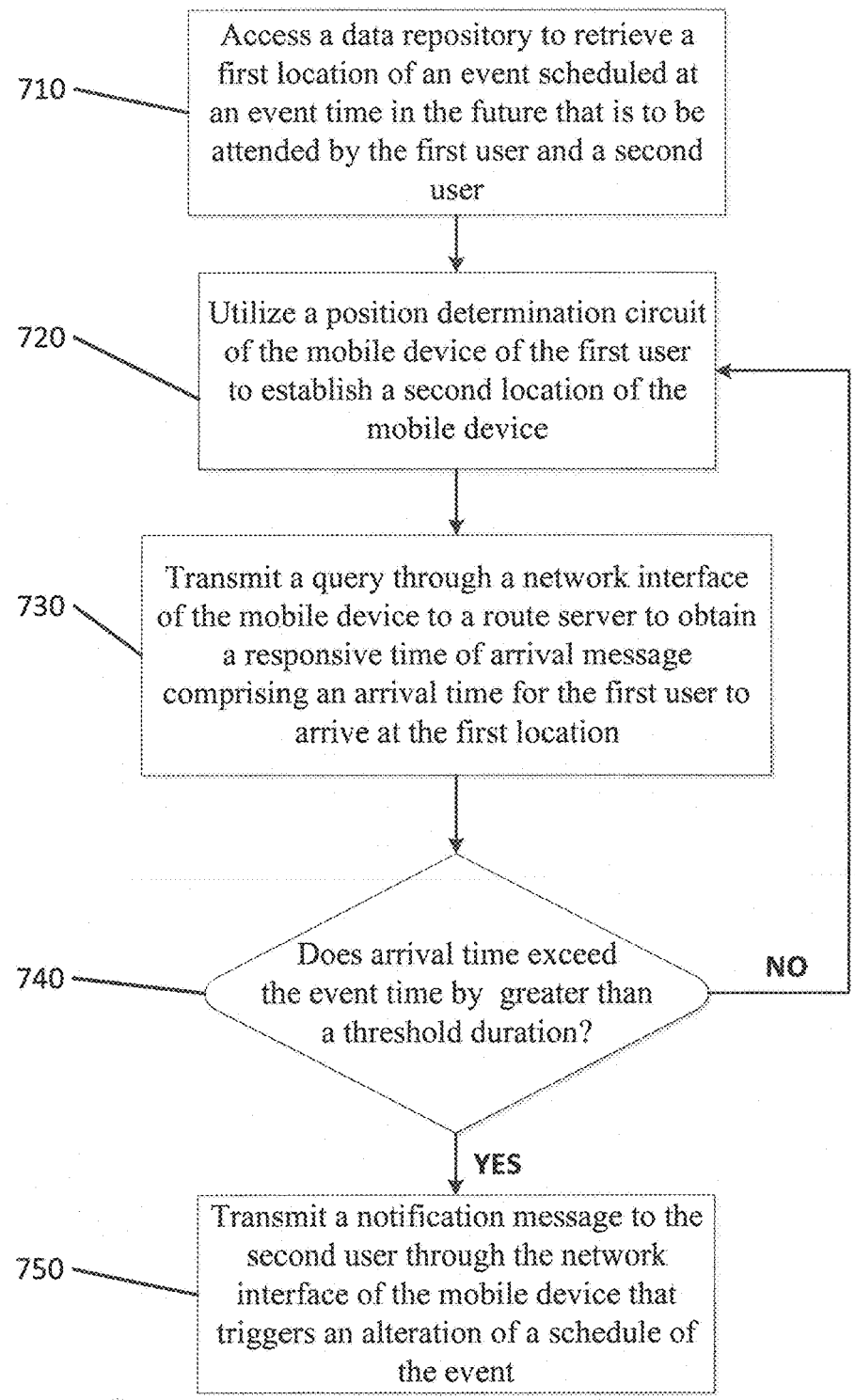
FIG. 7 illustrates an example of determining an adjustment to an event based on a calculated arrival time at the event according to embodiments of the present inventive concepts.

FIG. 7 illustrates an example for determining an adjustment to an event 135 based on a calculated arrival time 150 at the event 135 according to embodiments of the present inventive concepts.

Referring to FIG. 7, the operations may include a mobile device 105 of a first user 110 performing operation 710 accessing a data repository 125 to retrieve a first location 140 of an event 135 scheduled at an event time 145 in the future that is to be attended by the first user 110 and a second user 120.

In operation 720, the mobile device 105 may utilize a positioning circuit 175 of the mobile device 105 of the first user 110 to establish a second location 185 of the mobile device 105.

In operation 730, the mobile device 105 may transmit a query through a network interface of the mobile device 105 to a route server, such as external server 180 illustrated in FIG. 2, to obtain a responsive time of arrival message comprising an arrival time 150 for the first user 110 to arrive at the first location 140.

In operation 740, the mobile device may determine if the arrival time 150 exceeds the event time 145 by greater than a threshold duration.

Responsive to the arrival time 150 exceeding the event time 145 by greater than the threshold duration, the mobile device 105 may perform operation 750 including transmitting a notification message 350 to the second user 120 through the network interface of the mobile device 105 that triggers an alteration of a schedule of the event 135.

In some embodiments, Responsive to the arrival time 150 not exceeding the event time 145 by greater than the threshold duration, the mobile device 105 may continue the method by returning to operation 720.

Figure 8:
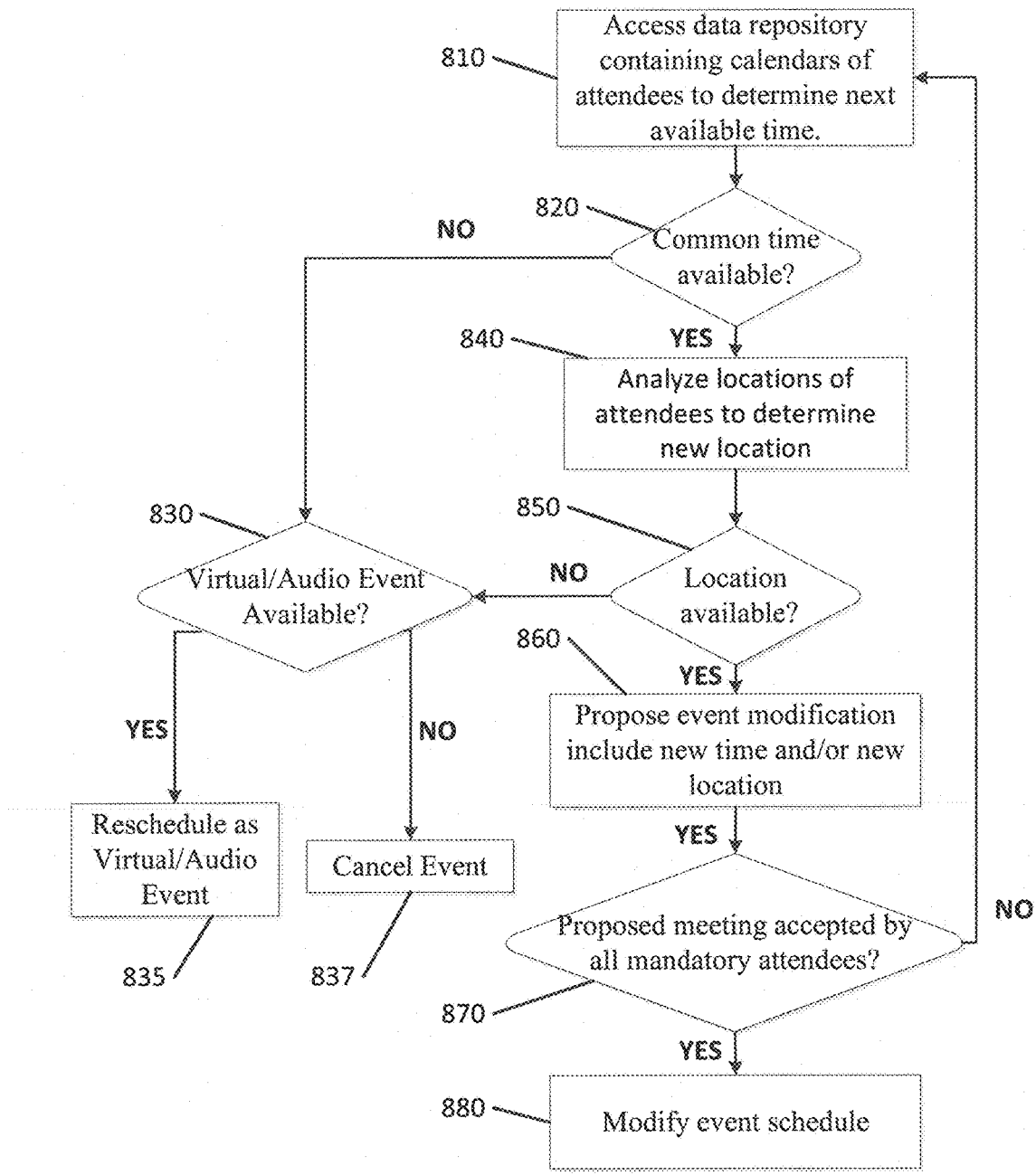
FIG. 8 illustrates an example of calculating an adjusted event time and/or adjusted event location according to embodiments of the present inventive concepts.

FIG. 8 illustrates an example for calculating an adjusted event time 340 and/or adjusted event location 440 according to embodiments of the present inventive concepts.

Referring to FIG. 8, the operations may include a mobile device 105 of a first user 110 performing operation 810 accessing a data repository 125 containing calendars of the first user 110 and the second user 120 that are scheduled to attend the event 135 to determine a next available time.

In operation 820, the mobile device 105 may determine if a common time is available between the first user 110 and the second user 120 in which both the first user 110 and the second user 120 are available.

If a common time cannot be found in which the first user 110 and the second user 120 are both available, the mobile device 105 may perform operation 830 in which a determination is made as to whether the current event 135 can be rescheduled as a audio event taking place via teleconference and/or a virtual event taking place via video. Though only video and audio conferences are illustrated in FIG. 8, it will be understood that other types of events make be considered. For example, the event 135 may take place via text messaging.

If the mobile device 105 determines that it is possible to reschedule the event 135 as a virtual and/or audio conference, the mobile device 105 may alter the schedule of the event 135 to be an audio and/or virtual event at operation 835. If the mobile device 105 determines that it is not possible to reschedule the event 135 as a virtual and/or audio conference, the mobile device 105 may alter the schedule of the event 135 at operation 837 to cancel the event 135. In some embodiments, the mobile device 105 may cancel the event 135 if the first user 110 is the originator of the event 135 and/or remove the first user 110 as an attendee if the first user 110 is not the originator of the event 135. In some embodiments, instead of canceling the event 135, the mobile device 105 may designate an alternate attendee 380 as described herein.

Returning to operation 820, if a modified event time 340 can be found in which the first user 110 and the second user 120 are both available, the mobile device 105 may analyze the first office location 410 of the first user 110 and the second office location 420 of the second user to 120 to determine a modified event location 440 at operation 840. It will be understood that finding a modified event location 440 may be optional and that, in some embodiments, the mobile device 105 may keep the original event location 140 without altering the event location 140.

At operation 850, the mobile device 105 may determine whether a modified event location 440 or the original location 140 is available for the event 135. If a modified event location 440 or the original event location 140 cannot be reserved at the modified event time 340, the mobile device 105 may perform the operation 830, as described herein, in which a determination is made as to whether the current event 135 can be rescheduled as an audio event taking place via teleconference and/or a virtual event taking place via video.

If the modified event location 440 or the original event location 140 can be reserved at the modified event time 340, the mobile device 105 may continue to operation 860 in which the mobile device 105 sends a notification message 350 to other attendees of the event 135 to propose the modified event time 340 and/or modified event location 440.

At operation 870, the mobile device 105 may determine if the proposal provided in the notification message 350 was accepted by the attendees of the event 135. In some embodiments, this determination may only consider whether the proposal provided in the notification message 350 was accepted by mandatory attendees of the event 135.

If the proposal was accepted, the mobile device 105 may continue to create a reservation operation 880 in which the event 135 is rescheduled at the modified event time 340 and/or modified event location 440. This may include the mobile device 105 to initiate reservation of the modified event location 440 and/or to release a reservation of the original event location 140. The modification may also include the mobile device 105 sending out a message including the modified schedule for the event 135.

If the event proposal was not accepted, the mobile device 105 may repeat the method at operation 810 to find a new common time for attendees of the event 135.

As illustrated in FIG. 8, operation 830 to determine if a virtual and/or audio event is available is performed if a common time cannot be found at operation 820. In some embodiments, operation 830 may be performed prior to operation 810 to find a common modified event time 340. That is to say that is some embodiments, the check as to whether an event 135 can be converted to a virtual and/or audio event may be performed first, before attempting to modify the time and/or location of the event 135.

Figure 9:
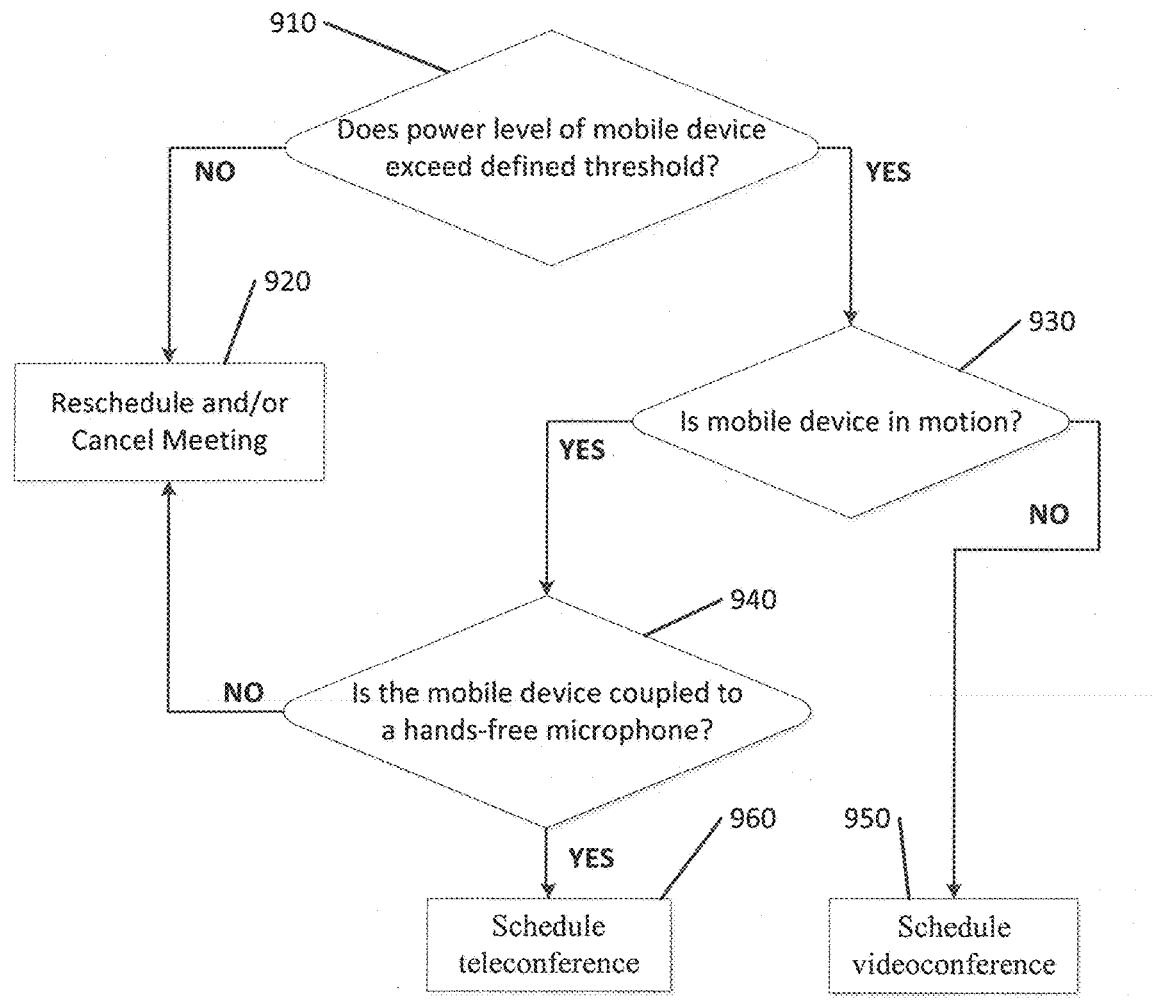
FIG. 9 illustrates an example of modifying an event to include audio and/or video conferencing according to embodiments of the present inventive concepts.

FIG. 9 illustrates an example for modifying an event 135 to include audio and/or video conferencing according to embodiments of the present inventive concepts. In some embodiments, the operations of FIG. 9 may correspond to the operation 830 as illustrated in FIG. 8.

In operation 910, the mobile device 105 may determine if a power level of the mobile device 105 exceeds a defined threshold. Operation 910 may determine, in some embodiments, that the power level of the mobile device 105 exceeds the defined threshold if it is coupled to a power supply and/or if the battery of the mobile device 105 exceeds a defined level.

If the power level of the mobile device 105 does not exceed the defined threshold, the mobile device 105 may continue to operation 920 in which the mobile device 105 performs operations to cancel or reschedule the meeting, as described herein.

If the power level of the mobile device 105 exceeds the defined threshold, the mobile device 105 may continue to operation 930 in which the mobile device 105 determines if the mobile device 105 is in motion and/or is moving at a speed below a particular speed threshold.

If the mobile device 105 is determined to not be in motion and/or is moving at a speed below the speed threshold, the mobile device 105 may continue to operation 950 in which the mobile device 105 modifies the event 135 to be a videoconference.

If the mobile device 105 is determined to be in motion and/or is moving at a speed above the speed threshold, the mobile device 105 may continue to operation 940 in which the mobile device 105 determines if there is a hands-free microphone, or similar device that supports hands-free operation, coupled to the mobile device 105. If such a microphone is present, the mobile device 105 may continue to operation 960 in which the mobile device 105 modifies the event 135 to be a teleconference. If such a microphone is not present, the mobile device 105 may continue to operation 920, discussed herein, in which the mobile device 105 reschedules and/or cancels the meeting.

Though FIG. 9 illustrates multiple decisions made by the mobile device 105 in determining whether an audio and/or video conference should be scheduled, it will be understood that, in some embodiments, respective decisions may be optional, depending on the capability of the mobile device 105 and/or preferences of the first user 110.

Figure 10:
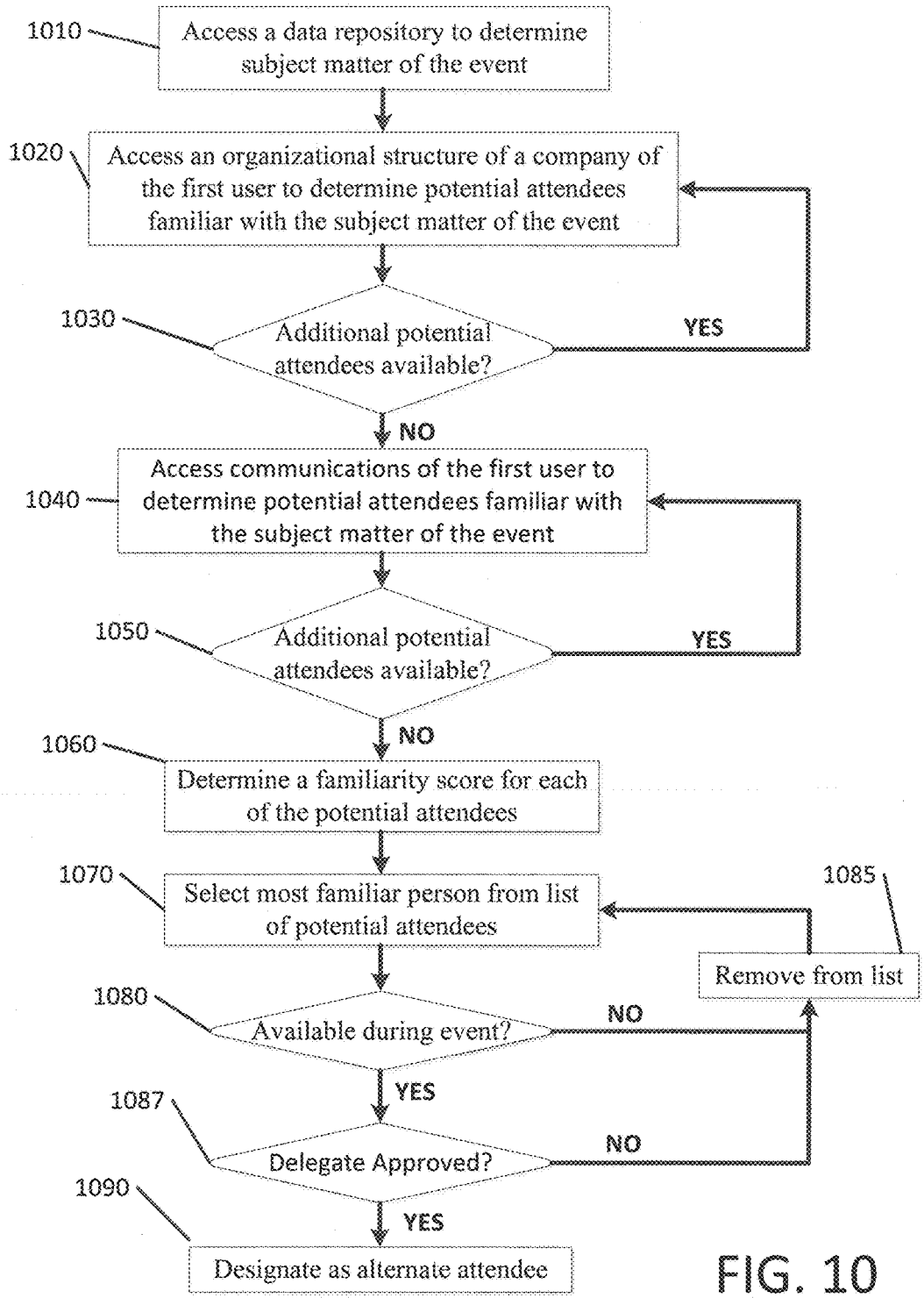
FIG. 10 illustrates an example of modifying an event to propose an alternate attendee according to embodiments of the present inventive concepts.

FIG. 10 illustrates an example of modifying an event 135 to propose an alternate attendee 380. In some embodiments, the operations of FIG. 10 may be performed alternatively or additionally to the operations of FIG. 8. For example, an alternate attendee 380 may be selected prior to, or instead of, altering a time and/or location of an event 135. In some embodiments, an alternate attendee 380 may be selected if a time and/or location of an event 135 cannot be changed and/or if an electronic conference (such as an audio or video conference) is not available for the first user 110. In some embodiments, an alternate attendee 380 may be selected prior to cancelling the event 135.

In operation 1010, the mobile device 105 may access a data repository to determine subject matter of the event 135. For example, the mobile device 105 may access a data repository such as data repository 125 illustrated in FIG. 1 to identify a subject of the event 135. The subject may be determined, for example, by a title of the event 135, supported documents associated with the event 135, and/or explicit tags and/or notations associated with the event 135 that clarify the subject matter.

The operations may continue with operation 1020 to access an organizational structure 370 of a company of the first user 110 to determine potential attendees familiar with the subject matter of the event 135. As described herein, in some embodiments, the organizational structure 370 may be accessed directly by the mobile device 105, either by accessing storage of the mobile device 105 and/or by accessing the organizational structure 370 over a network 130. In some embodiments, the mobile device 105 may request that the organizational structure 370 be accessed by another server, such as external server 180 of FIG. 1, on behalf of the mobile device 105. Operation 1020 may utilize machine learning, neural networks, and/or other forms of artificial intelligence to access the organizational structure 370 of the company of the first user 110 to determine potential attendees familiar with the subject matter of the event 135.

In some embodiments, access to the organizational structure 370 may include performing keyword searches on the organizational structure 370 to determine if potential attendees familiar with the subject matter of the event 135 are available within the organization. For example, the keywords used for the searches may come from the documents associated with the event 135, explicit tags and/or notations associated with the event 135, and/or other communications associated with the event 135 that may clarify its subject matter. The keyword search may be made against communications made by, or about, members of the organizational structure 370, such as in email, social media postings, online profiles, etc. that may be associated with potential attendees. For example, the organizational structure 370 may maintain profiles of members of the organizational structure 370 that may contain subject matter expertise, interests, and/or past projects of the members of the organizational structure 370. The access to the organizational structure 370 may parse through the members of the organizational structure 370 to determine connections with the subject matter of the event 135 so as to identify potential attendees to replace the first user 110 at the event 135.

In operation 1030, it may be determined whether other potential attendees for the 135 may be determined from the organizational structure 370. If other potential attendees are available from the organizational structure 370, operation 1020 may be repeated multiple times. Multiple potential attendees that are familiar with the subject matter of the event 135 may be determined from the organizational structure 370.

In addition to analyzing the organizational structure 370, operation 1040 may access communications of the first user 110 to determine potential attendees familiar with the subject matter of the event 135. As described herein, communications such as mail messages, text messages, and the like may be analyzed to determine if potential attendees have shared communications with the first user 110 related to the subject matter of the event 135. The analysis may include keyword searching for terms related to the event, as described herein with respect to operation 1020. In some embodiments, the communications of the first user 110 may be accessed to determine prior events attended by the first user 110. The subject matter of the those prior events may be compared to the currently scheduled event 135. If the subject matter of the prior event is similar to the currently scheduled event 135, the attendees of the prior event and/or communications related to the prior event, may be analyzed to determine if a potential attendee is available to replace the first user 110. Operation 1040 may be repeated multiple times, to identify multiple attendees, responsive to a determination that further potential attendees may be available, as determined at operation 1050. Operation 1040 may utilize machine learning, neural networks, and/or other forms of artificial intelligence to access communications of the first user 110 to determine potential attendees familiar with the subject matter of the event 135.

In operation 1060, a familiarity score may be determined for each of the potential attendees determined at operations 1020 and 1040. The familiarity score may reflect a relative familiarity that the potential attendee has with the subject matter of the event 135. This determination can include determining a rate of occurrence of keywords associated with the event 135, such as, for example, keywords associated with earlier scheduled events and/or emails between the first user 110 and scheduled attendees of the event 135, within communications of the potential attendee and/or information about the potential attendee retrieved from the organizational structure 370.

For example, based on a first potential attendee being within the same department as the first user 110, having previously attended a prior event with a similar subject matter as the currently scheduled event 135, and a determination that the first user 110 and the first potential attendee exchanged email on the subject matter of the event 135, the first potential attendee may be given a familiarity score of 90. A second potential attendee may be given a familiarity score of 60 based on previous attendance at an event with a similar subject matter as the currently scheduled event 135 but within a different department in the company of the first user. As another example, a third potential attendee may be given a higher familiarity score that a fourth potential attendee based on the third potential attendee having exchanged a higher number of emails with the first user 110 that contain keywords associated with the event 135. It will be understood that the familiarity scores may be higher as the potential attendee is more familiar with the subject matter of the event 135 or, in some embodiments, lower as the potential attendee is more familiar with the subject matter.

In operation 1070, the potential attendee that is most familiar with the subject matter of the event 135 may be selected and a determination may be made as to whether the potential attendee is available during the time 145 of the event 135. This determination may be made, for example, by looking at a schedule of the potential attendee.

If it is determined at operation 1080 that the potential attendee is not available during the time 145 of the event 135, the potential attendee may be removed from the list (operation 1085) and operation 1070 may be repeated.

If it is determined at operation 1080 that the potential attendee is available during the time 145 of the event 135, operation 1087 may be performed to determine if the potential attendee will accept the delegation to attend the event 135. As described herein, operation 1087 may involve sending a notification to the potential attendee requesting their permission to be alternate attendee 380. If the potential attendee refuses, the operations may continue at operation 1085 to remove the potential attendee from the list and repeat the selection of another potential attendee.

If the potential attendee accepts the assignment as the alternate attendee 380, the potential attendee may be designated as the alternate attendee 380 at operation 1090. As described herein, designating a potential attendee as the alternate attendee 380 may be accompanied by a notification 350 sent to other attendees of the event 135 that indicates that the first user 110 will be replaced by the alternate attendee 380.

Figure 11:
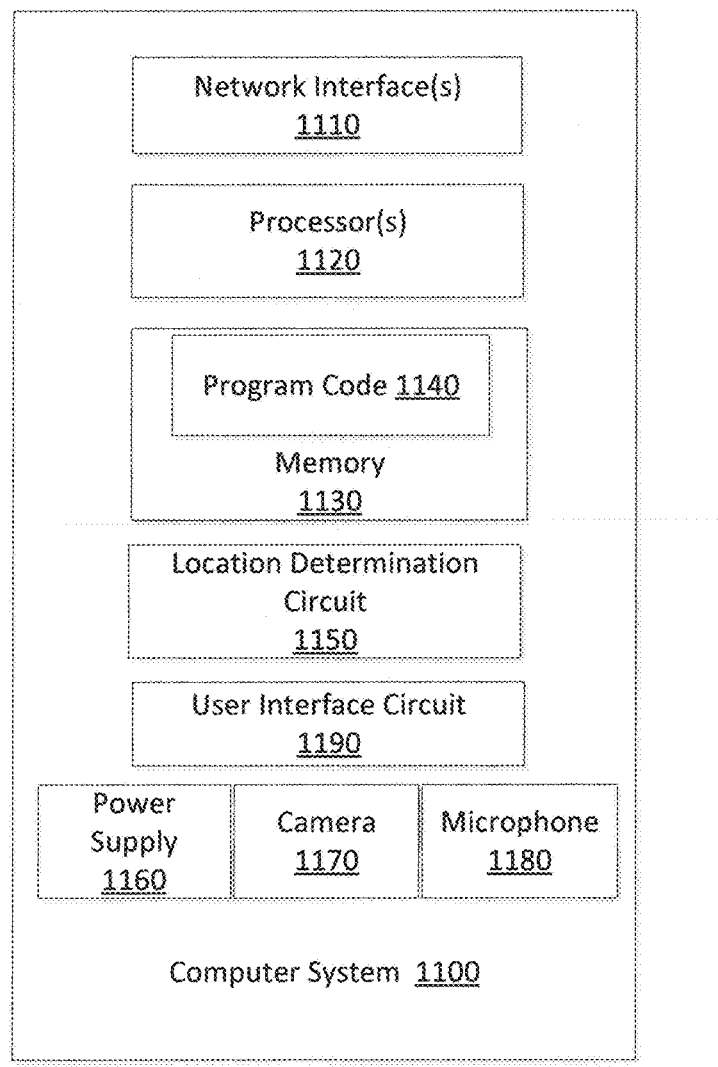
FIG. 11 illustrates a block diagram of a system capable of implementing embodiments of the present inventive concepts.

FIG. 11 illustrates a block diagram of a computer system 1100, such as the mobile device 105, capable of implementing embodiments of the present inventive concepts described herein, using hardware, software implemented with hardware, firmware, tangible computer-readable storage media having instructions stored thereon and/or a combination thereof, and may be implemented in one or more computer systems or other processing systems. The computer system 1100 may also be a virtual instance of a computer. As such, the devices and methods described herein may be embodied in any combination of hardware and software.

As shown in FIG. 11, the computer system 1100 may include a user interface circuit 1190, such as a keyboard, keypad, display, pointing device, speaker, etc., that communicates with one or more processors 1120 (generally referred to herein as "processor circuitry"). The processor 1120 may include one or more data processing circuits, such as a general purpose and/or special purpose processor (e.g., microprocessor and/or digital signal processor), which may be collocated or distributed across one or more data networks. The processor 1120 may be configured to execute computer program instructions from the memory 1130, described below as a computer readable medium, to perform some or all of the operations and methods for one or more of the embodiments disclosed herein.

The computer system 1100 may also include one or more network interfaces 1110 that may communicate with other communication devices and/or one or more networks, including any conventional, public and/or private, real and/or virtual, wired and/or wireless network, including the Internet. The network interfaces 1110 may include a communication interface and may be used to transfer information in the form of signals between the computer system 1100 and another computer system or a network (e.g., the Internet). The network interface 1110 may include a modem, a network interface (such as an Ethernet card), a wireless interface, a radio interface, a communications port, a PCM-CIA slot and card, or the like. These components may be conventional components, such as those used in many conventional computing devices, and their functionality, with respect to conventional operations, is generally known to those skilled in the art.

The computer system 1100 may further include a memory 1130 which may contain program code 1140 configured to execute operations associated with the operations described herein.

The memory 1130 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 1130 may also include systems and/or devices used for storage of the computer system 1100.

The computer system 1100 may also include a location determination circuit 1150. The location determination circuit 1150 may implement technology configured to determine a present position of the computer system 1100. The location determination circuit 1150 may include a GPS system configured to connect to a GPS infrastructure to determine the position of the computer system 1100. In some embodiments, the location determination circuit 1150 may be configured to transmit a message to a server external to the computer system 1100 to retrieve a position of the computer system 1100. In other words, in some embodiments, the physical position of the computer system 1100 may be determined by the server external to the computer system 1100 and communicated to the computer system 1100.

The computer system 1100 may also include a power supply 1160. The power supply 1160 may power the operations of the computer system 1100, and may include a battery and/or direct connection to an external power supply. In some embodiments, the power supply 1160 may include a charging circuit to charge a battery of the power supply 1160. The power 1160 may also include an interface to query a power level of the power supply 1160, such as, for example, a charge level of a battery of the power supply 1160.

The computer system 1100 may also include input devices such as, but not limited to, a camera 1170 and/or a microphone 1180. The input devices may be accessible to the one or more processors 1120 and may be operated by the program code 1140 resident in the memory 1130.

The present inventive concepts provide multiple improvements over the current technology. As described herein, the embodiments of the present inventive concepts provided automatic adjustment to event scheduling in a safe and convenient way. These embodiments provide for a safer experience for the user of the mobile device while improving the efficiency of event planning. Embodiments of the present inventive concepts decrease wasted time associated with waiting for events to begin and improve the utilization of resources utilized for the event. The automatic rescheduling and/or delegation of the event minimizes the use of network bandwidth associated with rescheduling the event and minimizes the interaction required to set up subsequently rescheduled meetings. In this way, the present inventive concepts improve the computerized scheduling process and decrease the amount of technological resources required to maintain and schedule events among multiple participants.

As will be appreciated by one skilled in the art, aspects of the present inventive concepts may be illustrated and described herein in any of a number of patentable classes or context including any new and useful process, machine, manufacture, or composition of matter, or any new and useful improvement thereof. Accordingly, aspects of the present inventive concepts may be implemented entirely hardware, entirely software (including firmware, resident software, micro-code, etc.) or combining software and hardware implementation that may all generally be referred to herein as a "circuit," "module," "component," or "system." Furthermore, aspects of the present inventive concepts may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present inventive concepts may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present inventive concepts are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various aspects of the present inventive concepts. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present inventive concepts has been presented for purposes of illustration and description, but is not intended to be exhaustive or limited to the disclosure in the form disclosed. Many modifications and variations will be apparent to those of ordinary skill in the art without departing from the scope and spirit of the present inventive concepts. The aspects of the present inventive concepts herein were chosen and described in order to best explain the principles of the present inventive concepts and the practical application, and to enable others of ordinary skill in the art to understand the disclosure with various modifications as are suited to the particular use contemplated.

The foregoing is illustrative of embodiments and is not to be construed as limiting thereof. Although some embodiments have been described, those skilled in the art will readily appreciate that many modifications are possible without materially departing from the novel teachings and advantages. Accordingly, all such modifications are intended to be included within the scope of this inventive concepts as defined in the claims. In the claims, means-plus-function clauses are intended to cover the structures described herein as performing the recited function, and not only structural equivalents but also equivalent structures.

What is claimed is:

1. A method for operating a mobile device of a first user comprising:
    accessing a data repository to retrieve a first location of an event scheduled at an event time in the future that is to be attended by the first user and a second user;
    obtaining, from a position determination circuit of the mobile device of the first user, a second location of the mobile device;
    automatically initiating transmission of a query through a network interface of the mobile device to a route server to responsively obtain a time of arrival message comprising an arrival time for the first user to arrive at the first location from the second location; and
    responsive to a difference in the arrival time and the event time exceeding a threshold duration, automatically initiating transmission of a notification message through the network interface of the mobile device that triggers a change in attendees that are physically present at the first location of the event without altering the event time of the event.

2. The method of claim 1, wherein, responsive to a determination that the mobile device supports conferencing electronically, the notification message that triggers the change in the attendees that are physically present at the first location of the event comprises information for conducting the event through an electronic conference.

3. The method of claim 2, wherein the notification message comprising the information for conducting the event through the electronic conference is initiated for transmission further responsive to a determination that the mobile device has a power level above a threshold level.

4. The method of claim 2, wherein the notification message comprising the information for conducting the event through the electronic conference is initiated for transmission further responsive to a determination that a call history of the mobile device contains a least one telephonic event performed between the first user and the second user.

5. The method of claim 2, wherein, responsive to a determination that the mobile device is in motion and supports hands-free operation, the notification message that triggers the change in the attendees that are physically present at the first location of the event comprises information for electronically establishing a phone conference for the event.

6. The method of claim 5, wherein responsive to a determination that the mobile device is not in motion, the notification message that triggers the change in the attendees that are physically present at the first location of the event comprises information for electronically establishing a video conference for the event.

7. The method of claim 1, further comprising:
    determining whether the first user is a mandatory attendee or an optional attendee of the event,
    wherein initiating transmission of the notification message through the network interface of the mobile device that triggers the change in the attendees that are physically present at the first location of the event is performed responsive to a determination that the first user is the mandatory attendee of the event and is not performed responsive to a determination that the first user is an optional attendee of the event.

8. The method of claim 1, wherein initiating transmission of the notification message through the network interface of the mobile device that triggers the change in the attendees that are physically present at the first location of the event is preceded by determining an alternate attendee to replace the first user at the event.

9. The method of claim 8, wherein determining the alternate attendee to replace the first user at the event comprises accessing the data repository associated with a company of the first user to identify the alternate attendee as a third user sharing a corresponding organizational position within the company as the first user.

10. The method of claim 8, wherein determining the alternate attendee to replace the first user at the event comprises:
    identifying a first company of the first user;
    accessing an email history of the first user to identify messages related to a subject of the event;
    identifying at least one user corresponding to the identified messages related to the subject of the event, wherein the at least one user is employed at a same company as the first company of the first user; and
    designating the at least one user as the alternate attendee.

11. A computer program product comprising:
a tangible non-transitory computer readable storage medium comprising computer readable program code embodied in the computer readable storage medium that when executed by at least one processor causes the at least one processor to perform operations comprising:
    accessing a data repository to retrieve a first location of an event scheduled at an event time in the future that is to be attended by a first user and a second user;
    obtaining from a position determination circuit of a mobile device of the first user, a second location of the mobile device;
    automatically initiating transmission of a query through a network interface of the mobile device to a route server to responsively obtain a time of arrival message comprising an arrival time for the first user to arrive at the first location from the second location; and
    responsive to a difference in the arrival time and the event time exceeding a threshold duration, automatically initiating transmission of a notification message through the network interface of the mobile device that triggers a change in attendees that are physically present at the first location of the event without altering the event time of the event.

12. The computer program product of claim 11, wherein, responsive to a determination that the mobile device is in motion and supports hands-free operation, the notification message that triggers the change in the attendees that are physically present at the first location of the event comprises information for electronically establishing a phone conference for the event, and
    wherein responsive to a determination that the mobile device is not in motion, the notification message that triggers the change in the attendees that are physically present at the first location of the event comprises information for electronically establishing a video conference for the event.

13. The computer program product of claim 12, wherein the notification message is initiated for transmission further responsive to a determination that the mobile device has a power level above a threshold level.

14. The computer program product of claim 11, wherein the operations further comprise determining whether the first user is a mandatory attendee or an optional attendee of the event, and
    wherein initiating transmission of the notification message through the network interface of the mobile device that triggers the change in the attendees that are physically present at the first location of the event is performed responsive to a determination that the first user is the mandatory attendee of the event and is not performed responsive to a determination that the first user is an optional attendee of the event.

15. The computer program product of claim 11, wherein the operations further comprise:
    providing the first user with an input to include additional content for inclusion with the notification message;
    recording audio content from the first user;
    converting the recorded audio content from the first user into text content; and
    initiating transmission of the text content through the network interface of the mobile device with the notification message that triggers the change in the attendees that are physically present at the first location of the event.

16. The computer program product of claim 11, wherein initiating transmission of the notification message through the network interface of the mobile device that triggers the change in the attendees that are physically present at the first location of the event is preceded by determining an alternate attendee to replace the first user at the event.

17. The computer program product of claim 16, wherein determining the alternate attendee to replace the first user at the event comprises accessing the data repository associated with a company of the first user to identify the alternate attendee as a third user sharing a corresponding organizational position within the company as the first user.

18. A computer system comprising:
a processor;
a position determination circuit;
a data repository;
a network interface; and
a memory coupled to the processor and comprising computer readable program code that when executed by the processor causes the processor to perform operations comprising:
    accessing the data repository to retrieve a first location of an event scheduled at an event time in the future that is to be attended by a first user and a second user;
    utilizing the position determination circuit to establish a second location of the computer system;
    automatically transmitting a query through the network interface to a route server to responsively obtain a time of arrival message comprising an arrival time for the first user to arrive at the first location from the second location; and
    responsive to a difference in the arrival time and the event time exceeding a threshold duration, automatically transmitting a notification message through the network interface that triggers a change in attendees that are physically present at the first location of the event without altering the event time of the event.

19. The computer system of claim 18, wherein, responsive to a determination that the computer system is in motion and supports hands-free operation, the notification message that triggers the change in the attendees that are physically present at the first location of the event comprises information for electronically establishing a phone conference for the event, and
    wherein responsive to a determination that the computer system is not in motion, the notification message that triggers the change in the attendees that are physically present at the first location of the event comprises information for electronically establishing a video conference for the event.

20. The computer system of claim 18, wherein transmitting the notification message through the network interface of the computer system that triggers the change in the attendees that are physically present at the first location of the event is preceded by determining an alternate attendee to replace the first user at the event.

\* \* \* \* \*